United States Patent
Zhang et al.

(10) Patent No.: US 12,032,234 B2
(45) Date of Patent: Jul. 9, 2024

(54) ANTI-PEEP DISPLAY ASSEMBLY AND DISPLAY DEVICE

(71) Applicant: Shanghai Tianma Micro-Electronics Co., Ltd., Shanghai (CN)

(72) Inventors: Zhiyuan Zhang, Shanghai (CN); Xintong Ling, Shanghai (CN); Fan Tian, Shanghai (CN); Xiongping Li, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/108,711

(22) Filed: Feb. 13, 2023

(65) Prior Publication Data

US 2024/0085729 A1    Mar. 14, 2024

(30) Foreign Application Priority Data

Sep. 13, 2022   (CN) .......................... 202211111168.0

(51) Int. Cl.
*G02F 1/13* (2006.01)
*F21V 8/00* (2006.01)
(Continued)

(52) U.S. Cl.
CPC ......... *G02F 1/1323* (2013.01); *G02B 6/0053* (2013.01); *G02F 1/13338* (2013.01);
(Continued)

(58) Field of Classification Search
CPC ............... G02F 1/1323; G02F 1/13471; G02F 1/13338; G02F 1/13437; G06F 3/0412
See application file for complete search history.

(56) References Cited

U.S. PATENT DOCUMENTS

2006/0164860 A1* 7/2006 Muraoka ........... G02F 1/133606
362/19
2009/0115943 A1* 5/2009 Gaides ............... B29D 11/0073
349/96
(Continued)

FOREIGN PATENT DOCUMENTS

CN     106647048 A     5/2017
CN     214474315 U    10/2021
(Continued)

*Primary Examiner* — Alexander P Gross
(74) *Attorney, Agent, or Firm* — Anova Law Group, PLLC

(57) ABSTRACT

Anti-peep display assembly and display device are provided. The anti-peep display assembly includes a backlight module, a first birefringence control type liquid crystal cell, a second birefringence control type liquid crystal cell, and a display liquid crystal cell. Along a thickness direction of the anti-peep display assembly, the first birefringence control type liquid crystal cell and the second birefringence control type liquid crystal cell are between the backlight module and the display liquid crystal cell, and the first birefringence control type liquid crystal cell is between the second birefringence control type liquid crystal cell and the backlight module. A first polarizer is arranged on a side of the display liquid crystal cell away from the second birefringence control type liquid crystal cell, and a second polarizer is arranged between the display liquid crystal cell and the second birefringence control type liquid crystal cell.

20 Claims, 16 Drawing Sheets

(51) Int. Cl.
 *G02F 1/1333* (2006.01)
 *G02F 1/1335* (2006.01)
 *G02F 1/13363* (2006.01)
 *G02F 1/1343* (2006.01)
 *G02F 1/1347* (2006.01)

(52) U.S. Cl.
 CPC .. *G02F 1/133514* (2013.01); *G02F 1/133528* (2013.01); *G02F 1/13363* (2013.01); *G02F 1/134309* (2013.01); *G02F 1/1347* (2013.01); G02F 2413/02 (2013.01)

(56) References Cited

U.S. PATENT DOCUMENTS

2020/0272012 A1* 8/2020 Yoshida ............ G02F 1/136286
2021/0149234 A1* 5/2021 Woodgate ......... G02F 1/133757
2021/0341769 A1* 11/2021 Woodgate ........... G02F 1/13363

FOREIGN PATENT DOCUMENTS

| CN | 214540287 U | 10/2021 |
| CN | 215813614 U | 2/2022 |
| CN | 114624907 A | 6/2022 |

* cited by examiner

# ANTI-PEEP DISPLAY ASSEMBLY AND DISPLAY DEVICE

CROSS-REFERENCE TO RELATED APPLICATION

This application claims priority of Chinese Patent Application No. 202211111168.0, filed on Sep. 13, 2022, the entire contents of which are hereby incorporated by reference.

FIELD OF THE DISCLOSURE

The present disclosure generally relates to the field of display technology and, more particularly, relates to an anti-peep display assembly and a display device.

BACKGROUND

Nowadays, display devices such as mobile phones and computers, have more and more extensive applications. Generally, a display device has a relatively large viewing angle, and a user can acquire displayed information at different viewing angles. However, in some scenarios, the user wishes that information displayed by the display device cannot be acquired by other users nearby, that is, the user wishes that the display device has an anti-peep function.

An existing anti-peep display device usually adopts an anti-peep assembly on a light-emitting surface of a display panel to filter out lights at a large viewing angle in an anti-peep stage, and only keeps lights perpendicular to a display screen, so that a user cannot receive pictures displayed on the display screen at a position at a large viewing angle, thereby realizing the anti-peeping function. However, when the anti-peep assembly is added to the light-emitting surface of the display panel, an introduction of the anti-peep assembly increases a reflectivity of a display product, and reflected lights are formed on a light-emitting side of the display device, thereby making the user difficult to clearly see a content displayed by the display device under strong lights, which seriously affects a display effect.

BRIEF SUMMARY OF THE DISCLOSURE

One aspect of the present disclosure provides an anti-peep display assembly. The anti-peep display assembly includes a backlight module, a first birefringence control type liquid crystal cell, a second birefringence control type liquid crystal cell, and a display liquid crystal cell. Along a thickness direction of the anti-peep display assembly, the first birefringence control type liquid crystal cell and the second birefringence control type liquid crystal cell are between the backlight module and the display liquid crystal cell, and the first birefringence control type liquid crystal cell is between the second birefringence control type liquid crystal cell and the backlight module. A first polarizer is arranged on a side of the display liquid crystal cell away from the second birefringence control type liquid crystal cell, a second polarizer is arranged between the display liquid crystal cell and the second birefringence control type liquid crystal cell, and transmission axes of the first polarizer and the second polarizer are perpendicular to each other. A third polarizer is arranged between the second birefringence control type liquid crystal cell and the first birefringence control type liquid crystal cell, a fourth polarizer is arranged between the first birefringence control type liquid crystal cell and the backlight module, and transmission axes of the second polarizer, the third polarizer, and the fourth polarizer are parallel to each other.

Another aspect of the present disclosure provides a display device. The display device includes an anti-peep display assembly. The anti-peep display assembly includes a backlight module, a first birefringence control type liquid crystal cell, a second birefringence control type liquid crystal cell, and a display liquid crystal cell. Along a thickness direction of the anti-peep display assembly, the first birefringence control type liquid crystal cell and the second birefringence control type liquid crystal cell are between the backlight module and the display liquid crystal cell, and the first birefringence control type liquid crystal cell is between the second birefringence control type liquid crystal cell and the backlight module. A first polarizer is arranged on a side of the display liquid crystal cell away from the second birefringence control type liquid crystal cell, a second polarizer is arranged between the display liquid crystal cell and the second birefringence control type liquid crystal cell, and transmission axes of the first polarizer and the second polarizer are perpendicular to each other. A third polarizer is arranged between the second birefringence control type liquid crystal cell and the first birefringence control type liquid crystal cell, a fourth polarizer is arranged between the first birefringence control type liquid crystal cell and the backlight module, and transmission axes of the second polarizer, the third polarizer, and the fourth polarizer are parallel to each other.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated in and constitute part of the present specification, illustrate embodiments of the present disclosure and together with a description, serve to explain principles of the present disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the present disclosure and specification or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and is not used as a limitation. Accordingly, other examples of exemplary embodiments may have different values.

It is apparent to a person skilled in the art that various modifications and variations can be made in the present disclosure without departing from the spirit or scope of the disclosures. Accordingly, the present disclosure is intended to cover modifications and variations of the present disclosure that fall within the scope of corresponding claims (claimed technical solutions) and equivalents thereof. It should be noted that, implementations provided in the embodiments of the present disclosure may be combined with each other without conflict.

It should be noted that similar numerals and letters refer to similar items in the accompanying drawing described below. Therefore, once an item is defined in one accompanying drawing, further discussion of the item in subsequent accompanying drawings may not be required.

Figure 1:
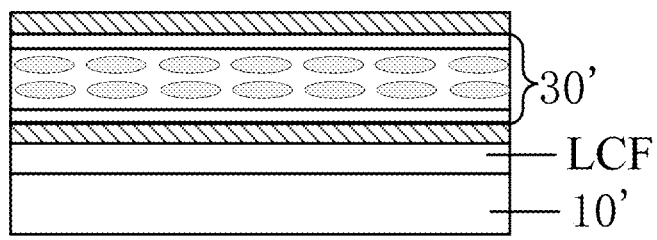
FIG. 1 illustrates a schematic diagram of an anti-peep display device.

FIG. 1 illustrates a schematic diagram of an anti-peep display device. To realize an anti-peep effect, a light control film (LCF) is introduced between a display panel 30' and a backlight module 10' in the anti-peep display device. The light control film usually includes a regularly arranged grid structure, which can control a range of light output angles with a certain loss of transmittance. At a same time, a functional layer without light scattering may lead to no sharing mode, so it is impossible to switch freely between an anti-peep mode and a sharing mode. Based on the above, if a film layer with light scattering function, such as a polymer liquid crystal layer, is introduced to achieve free switching between an anti-peep mode and a sharing mode, the transmittance may be further sacrificed, thereby increasing a power consumption of the display panel. Furthermore, a ripple effect may be observed, affecting a display effect.

Figure 2:
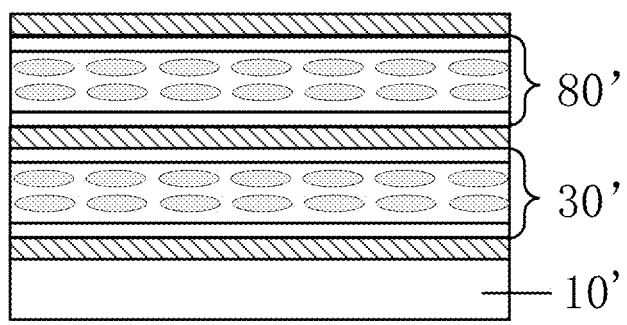
FIG. 2 illustrates another schematic diagram of an anti-peep display device.

FIG. 2 illustrates another schematic diagram of an anti-peep display device. The anti-peep display device includes a backlight module 10', a display panel 30' and an anti-peep assembly 80', through which the anti-peep and sharing modes can be freely switched. Optionally, the anti-peep assembly is a liquid crystal cell that can adjust the light output direction. However, in the anti-peep display device, the anti-peep assembly 80' is arranged on a light-emitting surface of the display panel 30'. When an anti-peep assembly is arranged on a light-emitting surface of a display panel, a display device common has a problem of high reflectivity. When a reflectivity is too high, a visibility of the display device is likely to decrease, glare, and affect information circulation. Especially when the anti-peep display device is applied to a vehicle display field, a high reflectivity of a vehicle display device may also bring security risks.

Figure 3:
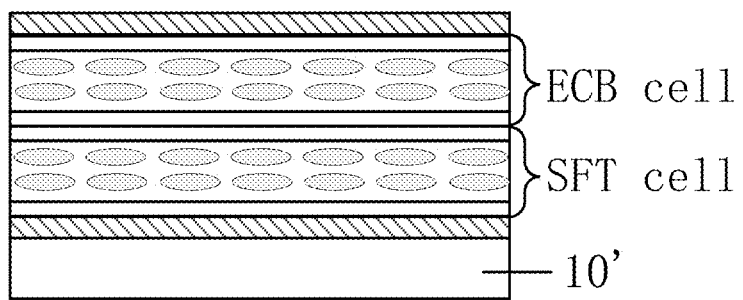
FIG. 3 illustrates another schematic diagram of an anti-peep display device.

FIG. 3 illustrates another schematic diagram of an anti-peep display device. The display device includes a backlight module 10', a display liquid crystal cell, i.e., a super FFS technology (SFT) cell and an anti-peep liquid crystal cell, i.e., an electrically controlled birefringence (ECB) cell, through which the anti-peep and sharing modes can be freely switched. No polarizer is arranged between the display liquid crystal cell and the anti-peep liquid crystal cell. The anti-peep display device utilizes a strabismus black-state light leakage to reduce a viewing angle contrast. By increasing a retardation of liquid crystal in an oblique viewing angle direction during black state display, a polarization state changes, thereby realizing black state light leakage. Although the viewing angle contrast is reduced, when the backlight module is turned on, a corresponding display screen may appear white, which affects a display effect.

Figure 4:
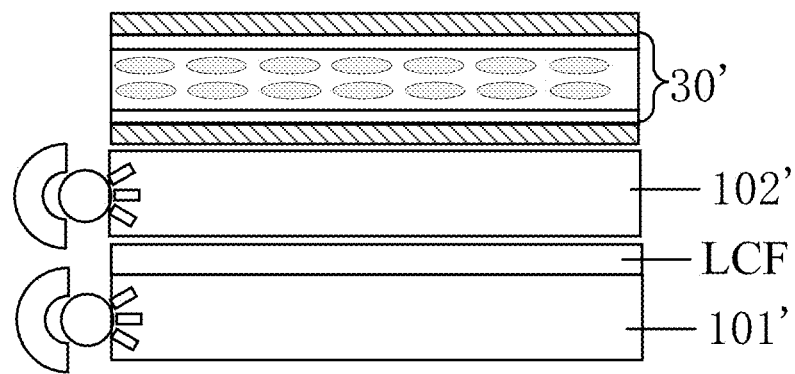
FIG. 4 illustrates another schematic diagram of an anti-peep display device.

FIG. 4 illustrates another schematic diagram of an anti-peep display device. Two backlight modules are introduced into the display device, which are respectively a first backlight module 101' and a second backlight module 102'. A light control film (LCF) is arranged between the first backlight module 101' and the second backlight module 102'. The first backlight module 101' provides a light source in the anti-peep mode, and the second backlight module 102' provides a light source in the sharing mode, so that the free switching between the anti-peep mode and the sharing mode can be realized. In the anti-peep mode, the first backlight module 101' is turned on, and the second backlight module 102' is turned off. In the sharing mode, the second backlight module 102' is turned on, and the first backlight module 101' is turned off. However, a luminous efficiency of the anti-peep display device is relatively low, and a power consumption of the anti-peep display device is relatively high. A specific reason for the above problem of the anti-peep display device is that when a side of the first backlight module 101' facing the second backlight module 102' is not provided with a brightness enhancement film, the light emitted by the first backlight module cannot be effectively utilized, thereby reducing a light efficiency of the first backlight module and increasing a power consumption of the anti-peep display device in the anti-peep mode. However, if a brightness enhancement film is added to the side of the first backlight module facing the second backlight module, a near-collimated light of the first backlight module in the anti-peep mode may be destroyed, thereby affecting an anti-peep performance.

In view of the above, the present disclosure provides an anti-peep display assembly, including a backlight module, a first birefringence control type liquid crystal cell, a second birefringence control type liquid crystal cell, and a display liquid crystal cell. Along a thickness direction of the anti-peep display assembly, the first birefringence control type liquid crystal cell and the second birefringence control type liquid crystal cell are between the backlight module and the first birefringence control type liquid crystal cell is between the second birefringence control type liquid crystal cell and the backlight module. A side of the display liquid crystal cell away from the second birefringence control type liquid crystal cell is arranged with a first polarizer, and a second polarizer is arranged between the display liquid crystal cell and the second birefringence control type liquid crystal cell. Transmission axes of the first polarizer and the second polarizer are perpendicular to each other. A third polarizer is arranged between the second birefringence control type liquid crystal cell and the first birefringence control type liquid crystal cell, and a fourth polarizer is arranged between the first birefringence control type liquid crystal cell and the backlight module. Transmission axes of the second polarizer, the third polarizer, and the fourth polarizer are parallel to each other. When the first birefringence control type liquid crystal cell and the second birefringence control type liquid crystal cell are introduced, the free switching between the sharing mode and the anti-peep mode is realized, which is conductive to improving an anti-peep effect. Meanwhile, by arranging the first birefringence control type liquid crystal cell and the second birefringence control type liquid crystal cell between the display liquid crystal cell and the backlight module, the display liquid crystal cell can block reflections of the first birefringence control type liquid crystal cell and the second birefringence control type liquid crystal cell to a large extent, which is conductive to reducing a reflection performance of a display product. The present specification does not use a polymer liquid crystal cell to achieve anti-peep, which is conductive to avoiding a phenomenon of low transmittance and high power consumption caused by using polymer liquid crystal to achieve an anti-peep function. In addition, the first birefringence control type liquid crystal cell, the second birefringence control type liquid crystal cell and the display liquid crystal cell in the present specification are independent optical devices, and a second polarizer is arranged between the display liquid crystal cell and the second birefringence control type liquid crystal cell. A rotation of liquid crystal in the first birefringence control type liquid crystal cell and the second birefringence control type liquid crystal cell may not affect a retardation change inside the display liquid crystal cell, but only control a viewing angle brightness of an incident light entering the display liquid crystal cell, which is conductive to avoiding an overall whitening of a display screen, and to improving a display effect of a display product. In the present specification, when a viewing angle is controlled by the first birefringence control type liquid crystal and the second birefringence control type liquid crystal cell, a structure of the backlight module may not be affected, so a light efficiency of the backlight module may not be affected, which is conductive to avoiding an excessive power consumption of the display product.

The above is a core idea of the present disclosure, and technical solutions in the embodiments of the present disclosure will be clearly and completely described below with reference to the accompanying drawings in the embodiments of the present disclosure. Based on the embodiments of the present disclosure, all other embodiments obtained by a person skilled in the art without creative efforts fall within the protection scope of the embodiments of the present disclosure.

Figure 5:
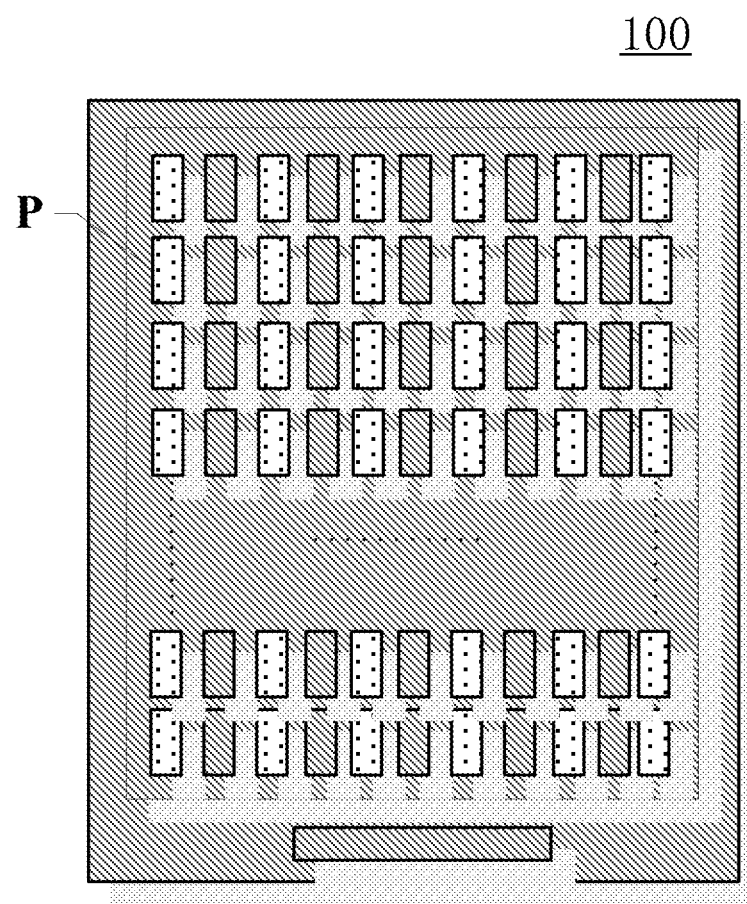
FIG. 5 illustrates a schematic diagram of an anti-peep display assembly consistent with various embodiments of the present disclosure.
Figure 6:
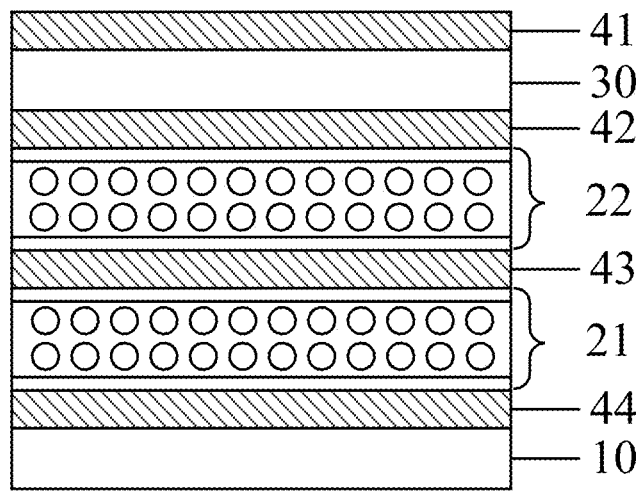
FIG. 6 illustrates a film layer diagram of an anti-peep display assembly consistent with various embodiments of the present disclosure.

FIG. 5 illustrates a schematic diagram of an anti-peep display device consistent with various embodiments of the present disclosure. FIG. 6 illustrates a film layer diagram of an anti-peep display assembly consistent with various embodiments of the present disclosure. Referring to FIGS. 5 and 6, one embodiment of the present disclosure provides an anti-peep display assembly 100 including a backlight module 10, a first birefringence control type liquid crystal cell 21, a second birefringence control type liquid crystal cell 22, and a display liquid crystal cell 30.

Along a thickness direction of the anti-peep display assembly 100, the first birefringence control type liquid crystal cell 21 and the second birefringence control type liquid crystal cell 22 are between the backlight module 10 and the display liquid crystal cell 30. The first birefringence control type liquid crystal cell 21 is between the second birefringence control type liquid crystal cell 22 and the backlight module 10.

A first polarizer 41 is arranged on a side of the display liquid crystal cell 30 away from the second birefringence control type liquid crystal cell 22, and a second polarizer 42 is arranged between the display liquid crystal cell 30 and the second birefringence control type liquid crystal cell 22. Transmission axes of the first polarizer 41 and the second polarizer 42 are perpendicular to each other. A third polarizer 43 is arranged between the second birefringence control type liquid crystal cell 22 and the first birefringence control type liquid crystal cell 21, and a fourth polarizer is arranged between the first birefringence control type liquid crystal cell 21 and the backlight module 10. Transmission axes of the second polarizer 42, the third polarizer 43, and a fourth polarizer 44 are parallel to each other.

It should be noted that FIG. 5 only takes the anti-peep display assembly with a rectangular structure as an example for description and does not limit an actual shape of the anti-peep display assembly in the present disclosure. In some other embodiments, the anti-peep display assembly may also be embodied in another shape such as a rounded rectangle, a circle, or the like. FIG. 5 illustrates that the display module includes a plurality of sub-pixels P arranged in an array, and shape, number and arrangement of the plurality of sub-pixels P are not limited. FIG. 6 only illustrates a relative positional relationship of the backlight module 10, the first birefringence control type liquid crystal cell 21, the second birefringence control type liquid crystal cell 22 and the display liquid crystal cell 30 in the anti-peep display assembly but does not represent an actual number and size of layers.

In a related art, to realize free switching between the anti-peep mode and the sharing mode, an implementation method is to arrange an anti-peep assembly on a light-emitting surface of the display liquid crystal cell (e.g., refer to FIG. 2). When an anti-peep assembly (such as a liquid crystal cell that can control a light output direction) is installed on the light-emitting surface, and when external lights are irradiated to a display product, since is no light-absorbing structure is arranged in the anti-peep assembly, when the external lights are irradiated on electrodes in the anti-peep assembly, more reflected lights may be generated at electrode interfaces, which may increase total reflections of a display product, and a display content of the display product cannot be clearly seen under strong lights, thereby seriously affecting a display effect.

In the anti-peep display assembly provided by the embodiment, a first birefringence control type liquid crystal cell 21 and a second birefringence control type liquid crystal cell 22 are introduced between the backlight module 10 and the display liquid crystal cell 30. That is, the first birefringence control type liquid crystal cell 21 and the second birefringence control type liquid crystal cell 22 are on the side of the display liquid crystal cell 30 facing the backlight module 10 but are not arranged on a light-emitting surface of the display liquid crystal cell 30. When external lights enter the anti-peep display assembly, the display liquid crystal cell 30 can block propagation paths of the external lights to the first birefringence control type liquid crystal cell 21 and the second birefringence control type liquid crystal cell 22 to a large extent. Therefore, a reflection phenomenon when light is irradiated to the first birefringence control type liquid crystal cell 21 and the second birefringence control type liquid crystal cell 22 is effectively reduced or avoided. In addition, optionally, the display liquid crystal cell is arranged with color resistances. When external lights are irradiated to the display liquid crystal cell, the color resistances have a certain absorption effect on part of the external lights. Meanwhile, the color resistances can also prevent the external lights from being further irradiated to the first birefringence control type liquid crystal cell 21 and the second birefringence control type liquid crystal cell 22, which is conductive to reducing an overall reflectivity of the anti-peep display assembly, improving a display effect of the anti-peep display assembly in an environment with strong external lights, and improving a user experience.

Figure 7:
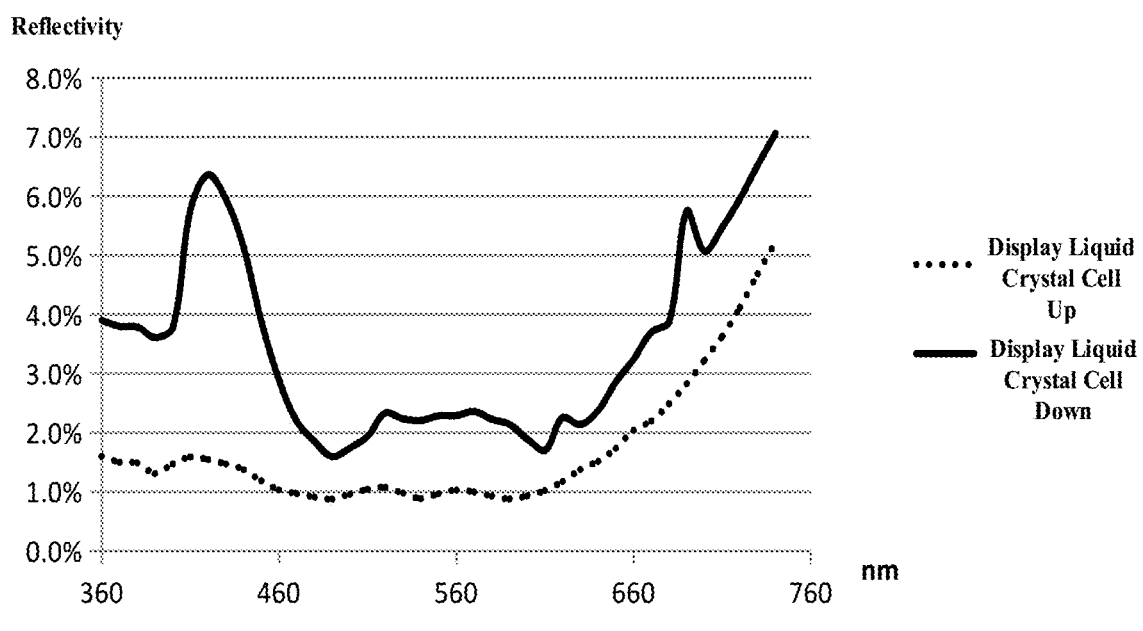
FIG. 7 illustrates a comparison chart of reflectivity of an anti-peep display assembly when the display liquid crystal cell is arranged in different positions.

FIG. 7 illustrates a comparison chart of reflectivity of an anti-peep display assembly when the display liquid crystal cell is arranged in different positions. Among two curves in FIG. 7, a structure of the anti-peep display assembly corresponding to a lower curve is a structure shown in FIG. 6, and a structure of the anti-peep display assembly corresponding to an upper curve is a structure in which the display liquid crystal cell is arranged between the backlight module 10 and the first birefringence control type liquid crystal cell 21 based on FIG. 6. When the display cell is arranged on a side of the first birefringence control type liquid crystal cell 21 and the second birefringence control type liquid crystal cell 22 away from the backlight module 10, since transmission axes of the first polarizer 41 and the second polarizer 42 on upper and lower sides of the display liquid crystal cell 30 are perpendicular to each other, external lights can be blocked from passing through the display liquid crystal cell 30. In addition, the color resistances in the display liquid crystal cell 30 can also absorb the external lights, thereby blocking passages of the external lights to the first birefringence control type liquid crystal cell 21 and the second birefringence control type liquid crystal cell 22, avoiding a reflection phenomenon at an interface between the first birefringence control type liquid crystal cell 21 and the second birefringence control type liquid crystal cell 22, which is equivalent to that the display liquid crystal cell 30 can play a concealing role for the first birefringence control type liquid crystal cell 21 and the second birefringence control type liquid crystal cell 22, thereby making a black state of the anti-peep display assembly darker. However, if the display liquid crystal cell is arranged between the first birefringence control type liquid crystal cell 21 and the backlight module 10, since the color resistances that can absorb lights are not arranged between the first birefringence control type liquid crystal cell 21 and the second birefringence control type liquid crystal cell 22, more reflected lights may be generated at electrode interfaces of the first birefringence control type liquid crystal cell 21 and the second birefringence control type liquid crystal cell 22, thereby increasing a total reflectivity of the anti-peep display assembly.

Furthermore, referring to FIG. 7, when the display liquid crystal cell 30 is arranged between the backlight module 10 and the first birefringence control type liquid crystal cell 21, reflectivities of lights with a wavelength between 360 nm and 460 nm are relatively high. Especially, reflectivities of lights with a wavelength around 420 nm are as high as 6.4%, which can easily lead to a bluish reflective color and are relatively harmful to human eyes. When the display liquid crystal cell 30 is arranged on a side of the first birefringence control type liquid crystal cell 21 and the second birefringence control type liquid crystal cell 22 away from the backlight module 10, an improvement of reflectivity is most obvious in lights with a wavelength between 360 nm and 460 nm, e.g., reflectivities of lights with a wavelength around 420 nm are reduced to 1.5%, thereby greatly reducing reflectivities of lights with a wavelength between 360 nm and 460 nm, which is conductive to improving or avoiding a phenomenon that a display effect of the anti-peep display assembly turns blue, and reducing harms of blue lights to human eyes. Therefore, arranging the display liquid crystal cell 30 on the side of the first birefringence control type liquid crystal cell 21 and the second birefringence control type liquid crystal cell 22 away from the backlight module 10 also has a certain eye protection effect. When the anti-peep display assembly of the present specification is applied to the vehicle display field, the anti-peep display assembly can effectively reduce light reflectivities, which is conductive to improving a visibility of a vehicle-mounted anti-peep display assembly under strong lights, effectively improving a glare phenomenon, and avoiding potential safety hazards caused by high light reflectivities.

In a related art shown in FIG. 3, no polarizer is arranged between the display liquid crystal cell and the anti-peep liquid crystal cell. Using black-state light leakage at oblique viewing angle to reduce viewing angle contrast may lead to an overall whitening of a display screen. In the anti-peep display assembly provided by the present specification, the display liquid crystal cell 30, the first birefringence control type liquid crystal cell 21 and the second birefringence control type liquid crystal cell 22 are arranged as mutually independent optical elements. A polarizer is arranged between the display liquid crystal cell 30 and the second birefringence control type liquid crystal cell 22. A rotation of liquid crystal in the first birefringence control type liquid crystal cell 21 and the second birefringence control type liquid crystal cell 22 does not affect a retardation change inside the display liquid crystal cell, and only controls a viewing angle brightness of an incident light entering the display liquid crystal cell 30. Therefore, a scheme of introducing the first birefringence control type liquid crystal cell 21 and the second birefringence control type liquid crystal cell 22 between the display liquid crystal cell 30 and the backlight module 10 in the present specification is also conductive to improving a whitening phenomenon of a display screen in the related art shown in FIG. 3, thereby improving a display effect of the anti-peep module.

Compared with a scheme in the related art shown in FIG. 4 in which two backlight modules are used to achieve the anti-peep effect, the anti-peep display assembly in the present specification controls viewing angles through the first birefringence control type liquid crystal cell 21 and the second birefringence control type liquid crystal cell 22 and does not control viewing angles through the backlight module, so a structure of the backlight module is not affected. A structure such as a brightness enhancement film can be arranged in the backlight module, which is conducive to ensuring a light efficiency of the backlight module, further ensuring an overall light efficiency of the anti-peep module and avoiding an overall high power consumption due to a low light efficiency of the backlight module.

The anti-peep display assembly provided by the embodiments realizes the free switching between the sharing mode and the anti-peep mode by introducing the first birefringence control type liquid crystal cell and the second birefringence control type liquid crystal cell. Meanwhile, arranging the display liquid crystal cell on a side of the birefringence control type liquid crystal cell away from the backlight module is conducive to reducing a reflectivity of the anti-peep display assembly, improving or avoiding a phenomenon that a display effect of the anti-peep display assembly turns blue, and reducing harms of blue lights to human eyes. When the anti-peep display assembly of the present specification is applied to the vehicle display field, the anti-peep display assembly of the present specification can effectively reduce light reflectivities, which is conductive to improving a visibility of a vehicle-mounted anti-peep display assembly under strong lights, effectively improving a glare phenomenon, and avoiding potential safety hazards caused by high light reflectivities.

Meanwhile, the present specification adopts birefringence control type liquid crystal cells to realize an anti-peep function, which is also conductive to avoiding a low transmittance and high power consumption phenomenon caused by using polymer liquid crystal to realize the anti-peep function. In addition, a rotation of liquid crystal in the first birefringence control type liquid crystal cell and the second birefringence control type liquid crystal cell in the present specification may not affect a retardation change inside the display liquid crystal cell, but only controls a viewing angle brightness of an incident light entering the display liquid crystal cell, which is conductive to avoiding an overall whitening phenomenon of the display screen and improving a display effect of a display product. Moreover, when viewing angles are controlled through the first birefringence control type liquid crystal cell and the second birefringence control type liquid crystal cell, a structure of the backlight module may not be affected, and a light efficiency of the backlight module may not be affected, which is conductive to avoiding an excessive power consumption of the display product.

Optionally, in an anti-peep display assembly provided by one embodiment of the present disclosure, the display liquid crystal cell 30 refers to a liquid crystal cell that is arranged with color resistances and plays a screen display function. The first birefringence control type liquid crystal cell 21 and the second birefringence control type liquid crystal cell 22 are liquid crystal cells for dimming light emitted by the backlight module 10 (e.g., light irradiated to the display liquid crystal cell 30 can be adjusted to a light in the shared mode or in the anti-peep mode), both of which include two opposite substrates and liquid crystal molecules filled between the two substrates. Electrode structures are arranged on surfaces of the two substrates facing the liquid crystal molecules, but no color-resisting structures are arranged on the two substrates, and no complicated driving circuits are arranged at a same time, only a wiring that provides signals to electrodes is required. Specific structures of the display liquid crystal cell 30, the first birefringence control type liquid crystal cell 21 and the second birefringence control type liquid crystal cell 22 will be described in subsequent embodiments. A first polarizer 41 and a second polarizer 42 are arranged on two sides of the display liquid crystal cell 30 to control a screen display, and transmission axes of the first polarizer 41 and the second polarizer 42 are orthogonal.

Optionally, in an anti-peep display assembly provided by one embodiment of the present disclosure, liquid crystal molecules filled in both the first birefringence control type liquid crystal cell 21 and the second birefringence control type liquid crystal cell 22 may be single-axis positive liquid crystals or single-axis negative liquid crystals. Optionally, the positive liquid crystals correspond to pretilt angles of 0° to 10°, the negative liquid crystals correspond to pretilt angles of 85° to 95°, and an alignment direction is 0° or 90°. The fourth polarizer 44 may be perpendicular or parallel to the alignment direction of the liquid crystals in the first birefringence control type liquid crystal cell 21 and may be parallel to absorption axis angles of the second polarizer 42, the third polarizer 43 and the fourth polarizer 44. The alignment direction of liquid crystals determines a viewing angle direction for anti-peep. For example, if the alignment direction of liquid crystals is 90°, left and right sides of the anti-peep display assembly are protected from peeping. If the alignment direction of liquid crystals is 0°, upper and lower sides of the anti-peep display assembly are protected from peeping. Optionally, a polarization direction of the fourth polarizer 44 is parallel to the alignment direction of liquid crystals, to obtain a better anti-peep effect.

Figure 8:
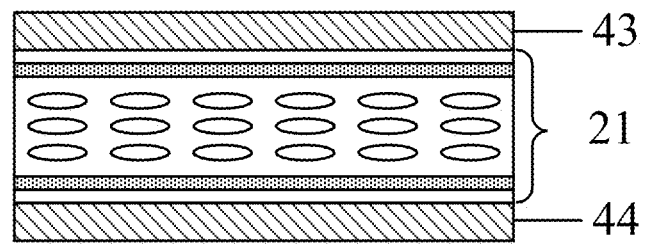
FIG. 8 illustrates a schematic diagram of liquid crystals in a first birefringence control type liquid crystal cell in an initial arrangement state.

When no electric field is applied, the liquid crystal molecules in the first birefringence control type liquid crystal cell 21 and the second birefringence control type liquid crystal cell 22 maintain an initial arrangement state thereof such as a complete "lying" or "standing" state in the liquid crystal cells. FIG. 8 illustrates a schematic diagram of liquid crystals in a first birefringence control type liquid crystal cell in an initial arrangement state. FIG. 8 is illustrated by taking the liquid crystal molecules completely "lying" in a liquid crystal cell when no power is applied to the liquid crystal cell. A working process of the second birefringence control type liquid crystal cell 22 may refer to the first birefringence control type liquid crystal cell 21, which is not repeated herein. In the present disclosure, transmission axes of the first polarizer 41 and the second polarizer 42 are arranged to be perpendicular to each other, and transmission axes of the second polarizer 42, the third polarizer 43, and the fourth polarizer 44 are arranged to be parallel to each other. Light irradiated on the display liquid crystal cell 30 is arranged to propagate along an optical axis. Two orthogonal light waves are arranged to advance at a same speed without a phase difference and any changes in optical properties, so there is no loss of brightness. Therefore, when no electric field is applied to the anti-peep display assembly, the liquid crystal molecules in the first birefringence control type liquid crystal cell 21 and the second birefringence control type liquid crystal cell 22 maintain initial arrangement states, and the anti-peep display assembly operates in a wide viewing angle mode (i.e., the sharing mode).

Figure 9:
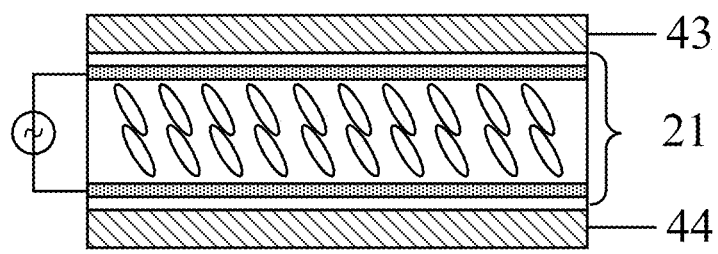
FIG. 9 illustrates an arrangement diagram of liquid crystals in a first birefringence control type liquid crystal cell after an electric field is received.

On the contrary, as shown in FIG. 9, when an electric field is applied to the liquid crystal molecules in the first birefringence control type liquid crystal cell 21 and the second birefringence control type liquid crystal cell 22, the liquid crystal molecules are rearranged, and the liquid crystals change from a "flat" or "upright" state to a tilted state, an incident light has an included angle with an optical axis. When an observer views from a central viewing angle, lights do not have phase differences, lights do not have any changes in optical properties, and a central brightness is not lost. When an observer views from a side viewing angle, lights have phase differences in two vibration directions, and part of the lights cannot be emitted from the second polarizer 42 and the third polarizer 43, so that a brightness at the side viewing angle is reduced or is not displayed to the observer at the side viewing angle. That is, when an electric field is applied to the liquid crystal molecules in the first birefringence control type liquid crystal cell 21 and the second birefringence control type liquid crystal cell 22, the anti-peep display assembly operates in a narrow viewing angle mode (i.e., the anti-peep mode). FIG. 9 illustrates an arrangement diagram of liquid crystals in the first birefringence control type liquid crystal cell 21 after an electric field is received.

In the anti-peep display assembly provided by the present disclosure, two birefringence control type liquid crystal cells are introduced between the display liquid crystal cell 30 and the backlight module 10. In the narrow viewing angle mode, both the first birefringence control type liquid crystal cell 21 and the second birefringence control type liquid crystal cell 22 can filter lights with a large viewing angle, and a combination of the first birefringence control type liquid crystal cell 21 and the second birefringence control type liquid crystal cell 22 can filter out more lights at large viewing angles, so that the anti-peep display assembly has a better anti-peep effect in the narrow viewing angle mode.

In an optional embodiment of the present disclosure, a phase difference of the liquid crystals in the first birefringence control type liquid crystal cell 21 and the second birefringence control type liquid crystal cell 22 is between 500 nm and 800 nm. When the liquid crystals in the first birefringence control type liquid crystal cell 21 and the second birefringence control type liquid crystal cell 22 are not powered on, the anti-peep display assembly is in the sharing mode; when the liquid crystals in the first birefringence control type liquid crystal cell 21 and the second birefringence control type liquid crystal cell 22 are powered on, the anti-peep display assembly is switched to be in the anti-peep mode. The liquid crystals are tilted to stand about 30~60°, and the most preferred tilt angle of the liquid crystals is 45°. When the phase difference between the liquid crystals in the first birefringence control type liquid crystal cell 21 and the second birefringence control type liquid crystal cell 22 is less than 500 nm or greater than 800 nm, in the anti-peep mode, lights emitted from the first birefringence control type liquid crystal cell 21 and the second birefringence control type liquid crystal cell 22 may have a leakage phenomenon at a large viewing angle, which affects the anti-peep effect of the anti-peep display assembly. Moreover, when the phase difference between the liquid crystals in the first birefringence control type liquid crystal cell 21 and the second birefringence control type liquid crystal cell 22 is greater than 800 nm, the anti-peep display assembly will also have a color shift, which affects a display effect. Therefore, in the present specification, when the phase difference of the liquid crystals in the first birefringence control type liquid crystal cell 21 and the second birefringence control type liquid crystal cell 22 is arranged to be between 500 nm and 800 nm, it is not only conductive to improving an anti-peep performance of the anti-peep display assembly, but also can avoid display color shift, thereby helping to improve an overall display effect of the anti-peep display assembly.

Optionally, the phase difference between the liquid crystals in the first birefringence control type liquid crystal cell 21 and the second birefringence control type liquid crystal cell 22 is between 650 nm and 700 nm, and the anti-peep performance and display effect are better at about 660 nm.

Figure 10:
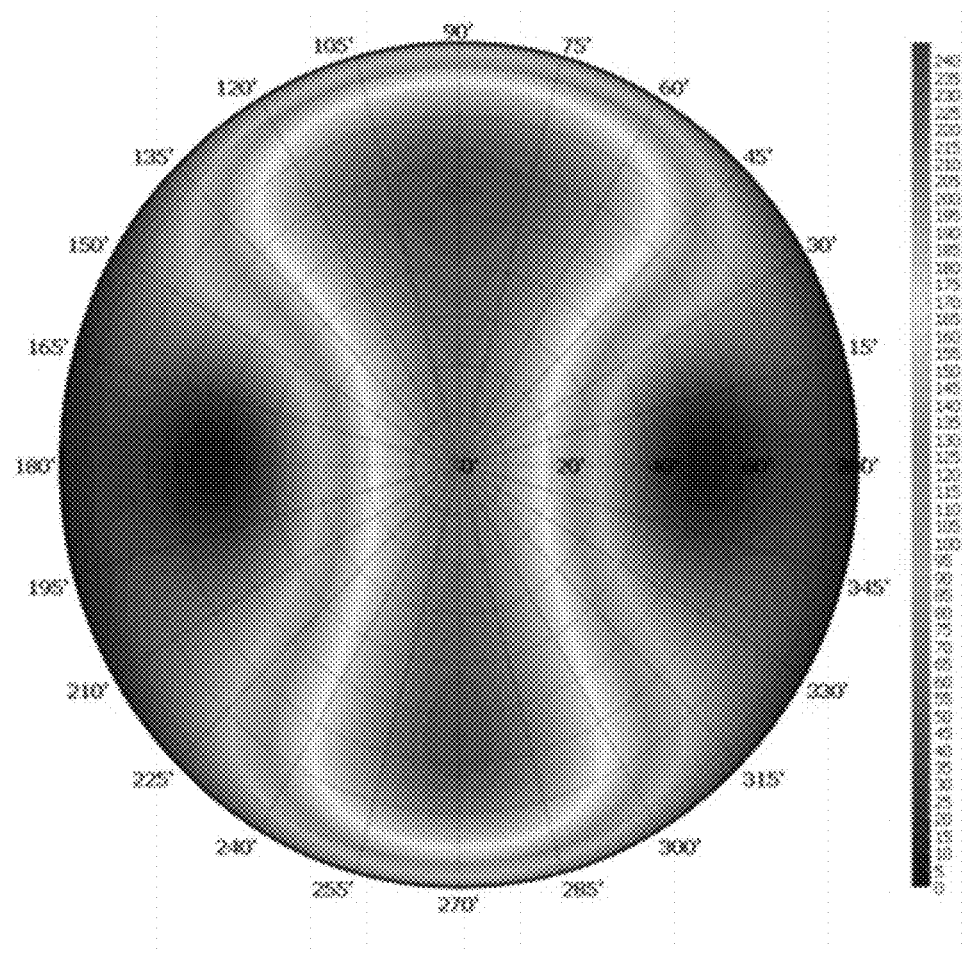
FIG. 10 illustrates a perspective rendering when a birefringence control type liquid crystal cell is introduced between a display liquid crystal cell and a backlight module.
Figure 11:
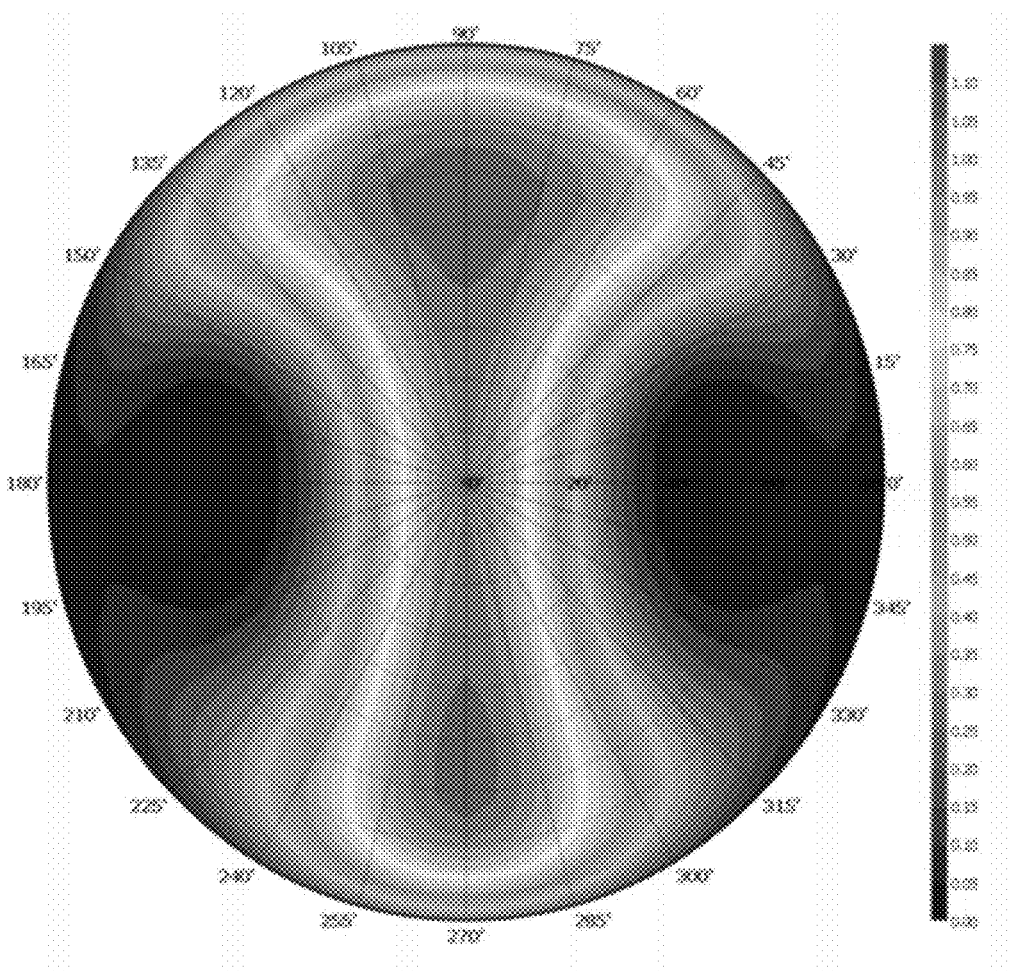
FIG. 11 illustrates a perspective rendering when two birefringence control type liquid crystal cells are introduced between a display liquid crystal cell and a backlight module.

FIG. 10 illustrates a perspective rendering when a birefringence control type liquid crystal cell is introduced between the display liquid crystal cell 30 and the backlight module 10. A structure of a corresponding anti-peep display assembly shown in FIG. 10 is a structure of the anti-peep display assembly shown in FIG. 6 from which a birefringence control type liquid crystal cell is removed. FIG. 11 illustrates a perspective rendering when two birefringence control type liquid crystal cells are introduced between the display liquid crystal cell 30 and the backlight module 10. A structure of a corresponding anti-peep display assembly shown in FIG. 11 is the structure of the anti-peep display assembly shown in FIG. 6. If anti-peep and sharing performances of the anti-peep display assembly are described with a 45° brightness and light-receiving ratio P45 at a viewing angle of 45°, P45=L45°/L0°, L45° is a brightness at a horizontal right oblique viewing angle of 45°, and L0° is a brightness at a vertical viewing angle. When the first birefringence control type liquid crystal cell 21 and the second birefringence control type liquid crystal cell 22 are simultaneously introduced into the anti-peep display assembly, in the anti-peep mode, P45<0.8%. When a single-layer birefringence control type liquid crystal cell is introduced into the anti-peep display assembly, in the anti-peep mode, P45<5%. Therefore, when two birefringence control type liquid crystal cells are introduced into the display liquid crystal cell 30 and the backlight module 10, an anti-peep performance of the anti-peep display assembly can be significantly improved by six times compared with an anti-peep performance of the anti-peep display assembly when a single birefringence control type liquid crystal cell is introduced into the display liquid crystal cell 30 and the backlight module 10, and a sharing performance of the anti-peep display assembly is not significantly lost. That is, when two birefringence viewing angles are introduced to control liquid crystal cells, an anti-peep viewing angle control effect of the anti-peep display assembly is better than an anti-peep viewing angle control effect of the anti-peep display assembly when a single birefringence viewing angle is introduced to control liquid crystal cells, which further verify that when the first birefringence control type liquid crystal cell 21 and the second birefringence control type liquid crystal cell 22 are introduced into the anti-peep display assembly in the present disclosure, the anti-peep display assembly has a better anti-peep effect in a narrow viewing angle mode.

It should be noted that the polarizers provided in the embodiments of the present disclosure may be embodied in sheet-like polarizers, or may be embodied in wire grid structures, which are not specifically limited herein.

Figure 12:
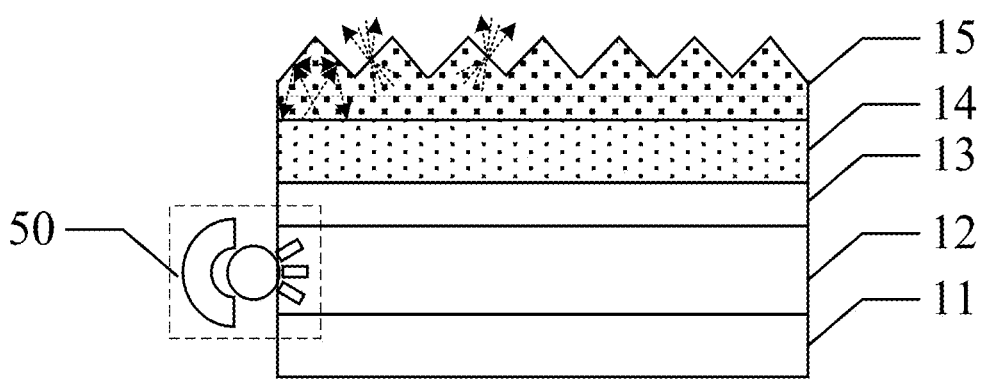
FIG. 12 illustrates a film layer diagram of a backlight module consistent with various embodiments of the present disclosure.

FIG. 12 illustrates a film layer diagram of a backlight module consistent with various embodiments of the present disclosure. One embodiment is described by taking the backlight module 10 as an edge-type backlight module 10 as an example, which is not limited herein. In some other embodiments, the backlight module 10 may also be embodied as a direct-type backlight module 10, which will be described in subsequent embodiments.

Referring to FIG. 6 and FIG. 12, in an optional embodiment, the backlight module 10 includes a reflective sheet 11, a light guide plate 12, a diffuser film 13, a first prism film 14 and a second prism film 15. Along a thickness direction of the backlight module 10, the reflective sheet 11 and the diffuser film 13 are respectively on two opposite surfaces of the light guide plate 12, the first prism film 14 is on a side surface of the diffuser film 13 away from the light guide plate 12, the second prism film 15 is on a side surface of the first prism film 14 away from the diffuser film 13, and the fourth polarizer 44 is on a side of the second prism film 15 away from the first prism film 14.

Specifically, a light output of the backlight module 10 directly affects a display brightness of the anti-peep display assembly, thereby directly affecting a display effect of the anti-peep display assembly. In one embodiment, two layers of prism films, i.e., the first prism film 14 and the second prism film 15 are introduced on a side of the diffuser film 13 in the backlight module 10 away from the light guide plate 12. Using a principle of refraction and total reflection of light by a prism in a prism film, an arrangement of two layers of prism films helps increase utilization rates of lights irradiated on prism films. Among the lights irradiated on the first prism film 14 and the second prism film 15, part of the lights can be reused after being reflected by prism structures, and another part of the lights can be gathered toward centers to achieve brightening effects, and viewing angles are more convergent. thereby improving an effective utilization of light, which also helps to improve a display brightness in a narrow viewing angle mode.

In an optional embodiment of the present disclosure, extending directions of the prisms in the first prism film 14 and the prisms in the second prism film 15 are orthogonal.

When the extending directions of the prisms in the first prism film 14 and the prisms in the second prism film 15 are orthogonal, the first prism film 14 and the second prism film 15 can play a role of concentrating lights, so that originally divergent lights are concentrated as much as possible on front view angles, thereby effectively improving a brightness of the anti-peep display assembly at the front view angles and helping to improve a display effect of the anti-peep display assembly at the front view angles.

Figure 13:
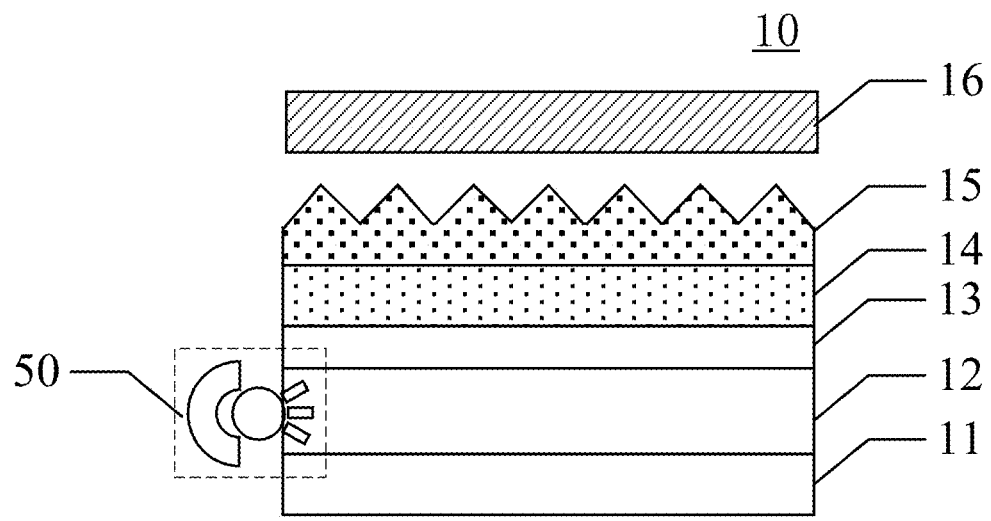
FIG. 13 illustrates another film layer diagram of a backlight module consistent with various embodiments of the present disclosure.

FIG. 13 illustrates another schematic diagram of a film layer of a backlight module consistent with various embodiments of the present disclosure. One embodiment is described by taking the backlight module 10 as an edge-type backlight module as an example, which is not limited herein. In some other embodiments, the backlight module 10 may also be embodied as a direct-type backlight module, which will be described in subsequent embodiments. A film structure of the backlight module 10 shown in FIG. 13 is equivalent to a dual-brightness enhancement film 16 added on the backlight module 10 of FIG. 12.

Referring to FIG. 6 and FIG. 13, in an optional embodiment of the present disclosure, the backlight module 10 further includes a dual-brightness enhancement film 16 between the second prism film 15 and the first birefringence control type liquid crystal cell 21.

Specifically, in the backlight module 10 provided by the embodiment of the present disclosure, the dual-brightness enhancement film 16 is introduced on the side of the second prism film 15 away from the first prism film 14. The dual-brightness enhancement film 16 can be regarded as a reflective polarizer. By selectively reflecting the light of the light source 50 in the backlight module of the backlight module 10, lights in the light source 50 that may not be transmitted to the first birefringence control type liquid crystal cell 21 can be reused. The dual-brightness enhancement film 16 cooperates with the first prism film 14 and the second prism film 15, which is conductive to further improving a display brightness of the anti-peep display assembly. In addition, the reflection moiré phenomenon that may occur in the anti-peep display assembly can be effectively reduced, thereby further improving the display effect of the anti-peep display assembly.

Figure 14:
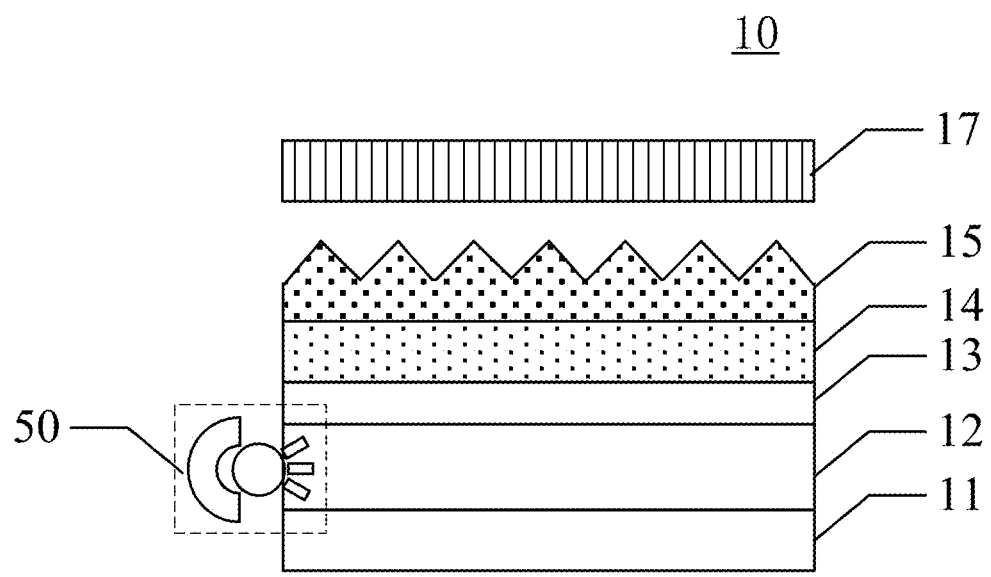
FIG. 14 illustrates another film layer diagram of a backlight module consistent with various embodiments of the present disclosure.

FIG. 14 illustrates another film layer diagram of the backlight module 10 consistent with various embodiments of the present disclosure. One embodiment is described by taking the backlight module 10 as an edge-type backlight module as an example, but it is not limited thereto. In some other embodiments, the backlight module 10 may also be embodied as a direct type of backlight module, which will be described in subsequent embodiments. The backlight module 10 shown in FIG. 14 is equivalent to the backlight module 10 shown in FIG. 12 with an additional light control film 17.

Referring to FIG. 6 and FIG. 14, in an optional embodiment of the present disclosure, the backlight module 10 further includes a light control film 17 between the second prism film 15 and the first birefringence control type liquid crystal cell 21.

Specifically, in the backlight module 10 provided by the embodiment, the light control film 17 is introduced on a side of the second prism film 15 away from the first prism film 14. Optionally, the light control film 17 has a regularly arranged grid structure, which can well limit the light-emitting angle range and is used in conjunction with the first birefringence control type liquid crystal cell 21 and the second birefringence control type liquid crystal cell 22, thereby helping to achieve an anti-peep effect at a narrower viewing angle. In addition, the light control film 17 can also achieve an effect of receiving lights up and down. When the anti-peep display assembly is applied to a vehicle display product, reflections on the windshield can be effectively reduced, and a user experience effect can be improved.

Figure 15:
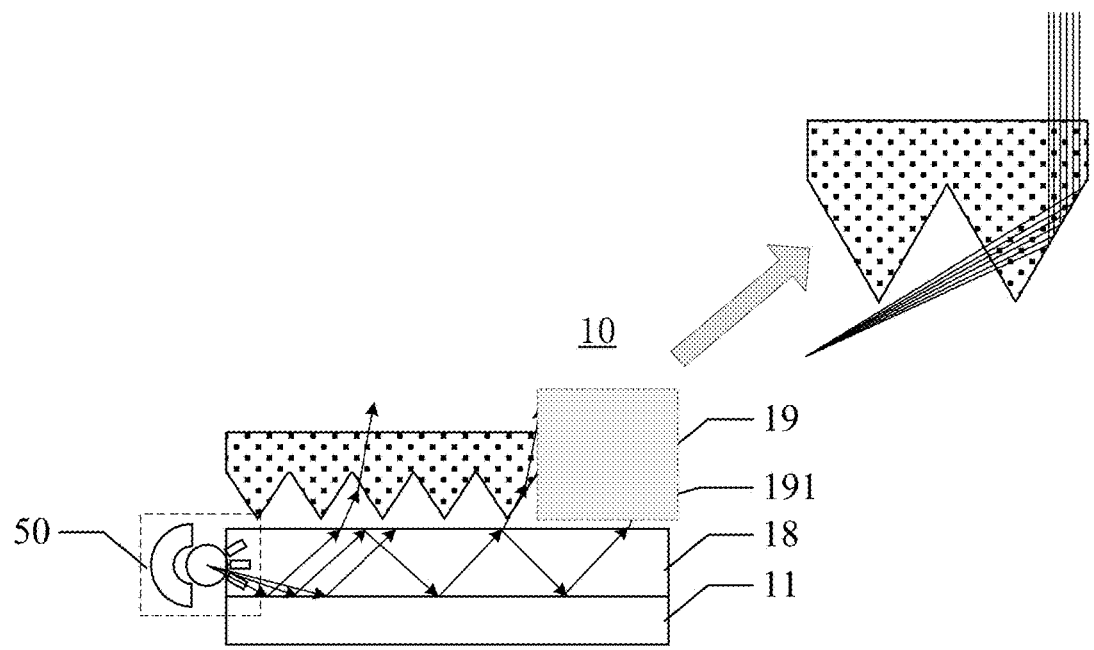
FIG. 15 illustrates another film layer diagram of a backlight module consistent with various embodiments of the present disclosure.

FIG. 15 illustrates another film layer diagram of a backlight module consistent with various embodiments of the present disclosure. One embodiment is described by taking the backlight module 10 as an edge-type backlight module as an example, which is not limited herein. In some other embodiments, the backlight module 10 may also be embodied as a direct-type backlight module, which will be described in subsequent embodiments.

It should be noted that FIGS. 12-14 only illustrate part of structures of the backlight module. In a specific embodiment, the backlight module may further include components such as a backplane, a plastic frame or an iron frame, and sheet metals for fixing the backlight module, the display liquid crystal cell, and the control type liquid crystal cell. In addition, in the anti-peep display assembly provided by the embodiment of the present disclosure, the control type liquid crystal cell and the display liquid crystal cell are fixedly connected, e.g., the control type liquid crystal cell and the display liquid crystal cell can be fixed by an optical glue bonding.

Referring to FIG. 6 and FIG. 15, in an optional embodiment, the backlight module 10 includes a reflector 11, a collimating light guide plate 18 and a reverse prism film 19. The reflective sheet 11 and the inverse prism film 19 are respectively on opposite sides of the collimating light guide plate 18. The fourth polarizer 44 is on a side of the inverse prism film 19 away from the collimating light guide plate 18.

Specifically, referring to FIG. 6 and FIG. 15, when the anti-peep display assembly provided by the embodiment adopts a structure of the backlight module 10 shown in FIG. 15, number of film layers of the backlight module 10 is relatively small, which is conductive to reducing an overall thickness of the backlight module 10, and further reducing an overall thickness of the anti-peep display assembly.

In the backlight module 10 corresponding to the embodiment, after lights emitted from a light source are refracted by a dot structure of the collimating light guide plate 18, a direction of the lights emitted from the light surface of the collimating light guide plate 18 has a high degree of convergence and concentration. After part of the lights pass through the inverse prism film 19, convex microstructures on the inverse prism film 19 can make highly concentrated lights conducted by the collimating light guide plate 18 conduct total reflections in a vertical direction, so that an optical viewing angle of the backlight module is highly collimated. When the backlight module is used together with the first birefringence control type liquid crystal cell 21 and the second birefringence control type liquid crystal cell 22, the anti-peep display assembly has a better anti-peep effect in the narrow viewing angle mode. In addition, the collimating light guide plate 18 is used together with the inverse prism film 19. After a viewing angle is converged, a brightness of a vertical center of the collimating light guide plate 18 is greatly improved, which is conductive to reducing a power consumption caused by improving a brightness of the anti-peep display assembly. Therefore, a display effect of the anti-peep display assembly in the narrow viewing angle mode is improved and a battery life of the anti-peep display assembly is improved.

Referring to FIG. 15, in an optional embodiment of the present disclosure, the inverse prism film 19 includes protruding microstructures 191 on a surface of the inverse prism film 19 facing the collimating light guide plate 18.

Specifically, in one embodiment, the protruding microstructures 191 in the inverse prism film 19 are arranged along a direction facing the collimating light guide plate 18. The protruding microstructures 191 have effects of reflection, diffusion, light collection, light mixing, and the like, so that reflected lights can be further uniformly diffused to increase brightness of the backlight module, which can converge the lights at oblique angles without sacrificing brightness, thereby helping to improve a light efficiency of the backlight module. When the inverse prism film 19 and the light guide plate 12 are used together, there is no need to separately introduce structures such as a diffuser film, a brightness enhancement film, and the like, which is conductive to simplifying a structure of the backlight module 10, and further simplifying an overall structural complexity of the anti-peep display assembly.

Referring to FIG. 6, in an optional embodiment, along the thickness direction of the backlight module 10, no light control films are arranged between the backlight module 10 and the fourth polarizer 44, and between the fourth polarizer 44 and the first birefringence between the control-type liquid crystal cells 21. The backlight module can adopt a structure shown in FIG. 12, FIG. 13 or FIG. 15.

In a related art, when a light control film is introduced into a display product, the light control film has a regularly arranged grid structure. Although a range of light output angles can be well limited, there will be a certain loss of transmittance. At a same time, if there is no light-scattering functional layer, there will be no sharing mode for a display product. If a light-scattering functional layer such as a polymer liquid crystal layer is introduced, a transmittance may be further sacrificed, thereby increasing a power consumption of a display product. When a light control film is introduced into the display product, a ripple effect may be observed, and a display effect is affected.

In the anti-peep display assembly provided by one embodiment, no light control film is arranged between the backlight module 10 and the fourth polarizer 44 and between the fourth polarizer 44 and the first birefringence control type liquid crystal cell 21 film, so as to avoid introducing a regularly arranged grid structure between the backlight module 10 and the fourth polarizer 44 and between the fourth polarizer 44 and the first birefringence control type liquid crystal cell 21, thereby eliminating a ripple effect, and helping to improve a display effect of the anti-peep display assembly. At a same time, canceling the light control film is conductive to avoiding an increase in power consumption caused by introducing a light-scattering functional layer to achieve the sharing mode, i.e., canceling the light control film is conductive to reducing a power consumption of the anti-peep display assembly. In addition, after the light control film is canceled, a visible range of the anti-peep display assembly in the sharing mode is larger, which is conductive to improving a display effect in the sharing mode. When the light control film canceled, in one embodiment, the first birefringence control type liquid crystal cell 21 and the second birefringence control type liquid crystal cell 22 are arranged between the display liquid crystal cell 30 and the backlight module 10, and the backlight module can be set as a structure of the backlight module shown in FIG. 15, Lights provided by the backlight module 10 are highly collimated by the collimating light guide plate 18 and the inverse prism film 19, which is more conducive to converging the viewing angle in the anti-peep mode and improving the anti-peep effect with a combination of birefringence control type liquid crystal cells. In addition, in the sharing mode, when no electric field is applied to electrodes in the birefringence control type liquid crystal cells, the liquid crystal molecules in the birefringence control type liquid crystal cell 22 maintain an original arrangement state, and lights passes through the birefringence control type liquid crystal cells without specific optical changes. Therefore, there is no loss of brightness, so a display brightness in the sharing mode can be guaranteed.

Figure 16:
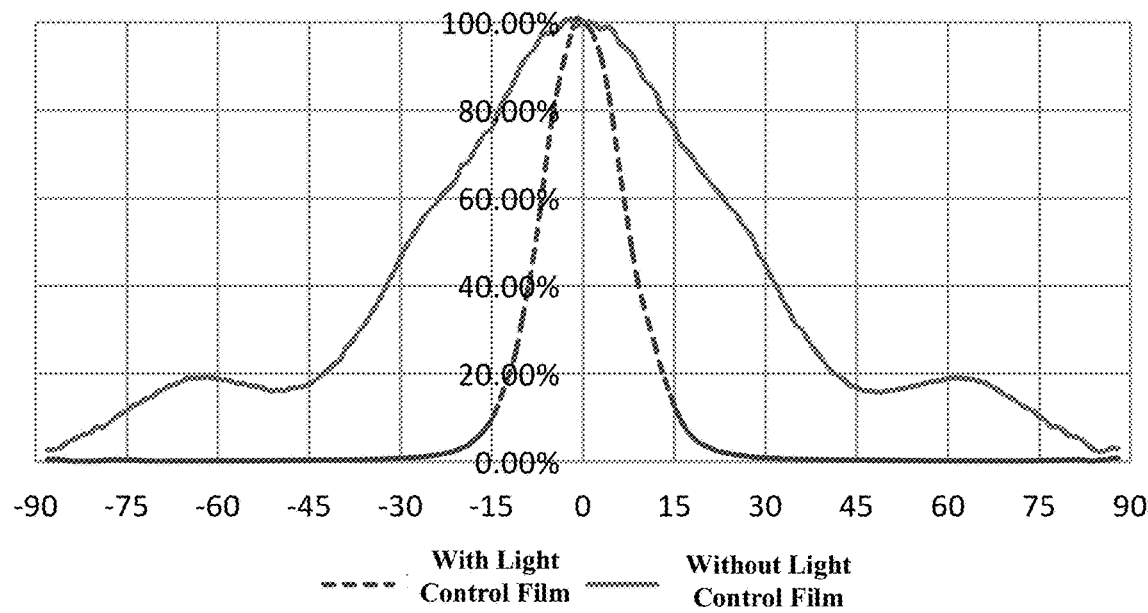
FIG. 16 illustrates a brightness comparison chart at a sharing viewing angle when a light control film is introduced into an anti-peep display assembly and when a light control film is not introduced into an anti-peep display assembly.
Figure 17:
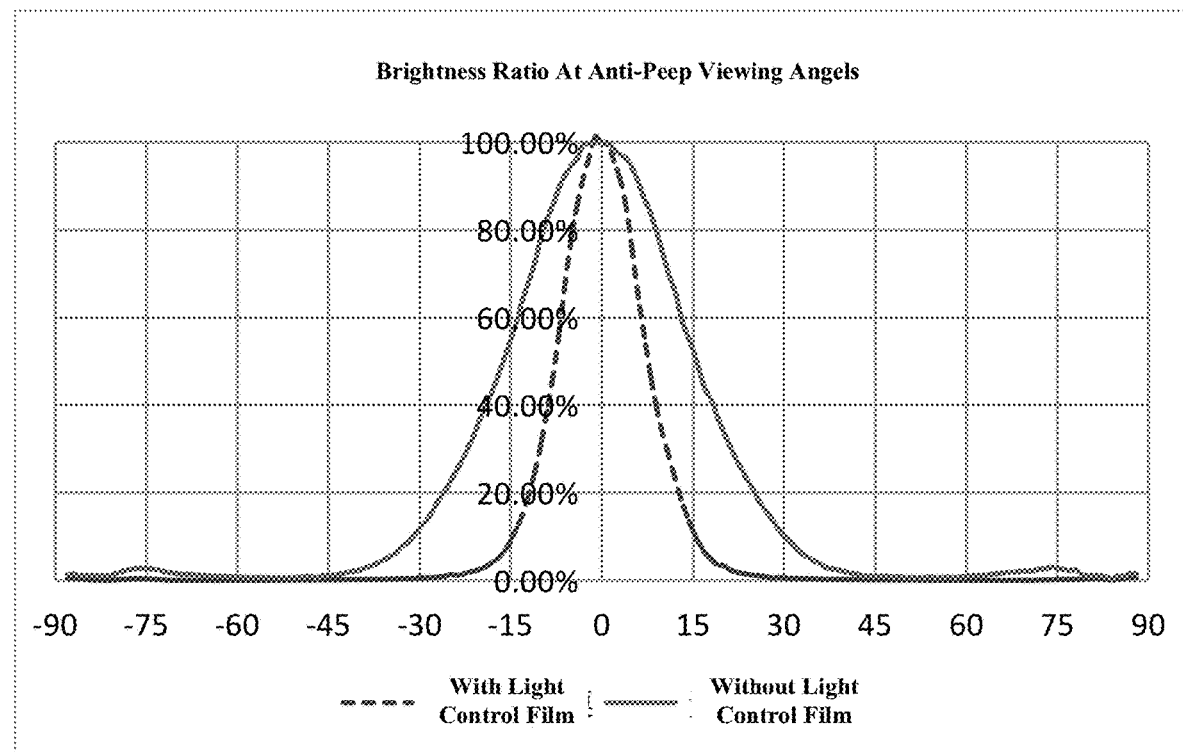
FIG. 17 illustrates a brightness comparison chart at an anti-peep viewing angle when a light control film is introduced into an anti-peep display assembly and when a light control film is not introduced into an anti-peep display assembly.

FIG. 16 illustrates a brightness comparison chart at a sharing viewing angle when a light control film is introduced into an anti-peep display assembly and when a light control film is not introduced into an anti-peep display assembly. FIG. 17 illustrates a brightness comparison chart at an anti-peep viewing angle when a light control film is introduced into an anti-peep display assembly and when a light control film is not introduced into an anti-peep display assembly. A structure of the anti-peep display assembly without the introduction of the light control film can refer to FIG. 6, and a structure of the corresponding backlight module 10 can refer to FIG. 12. A structure of the anti-peep display assembly with the introduction of the light control film can be based on a structure of the anti-peep display assembly shown in FIG. 6, in which the backlight module 10 adopts a structure of the backlight module 10 shown in FIG. 14. Referring to FIGS. 16 and 17, after the introduction of the light control film, brightness at the sharing viewing angle is significantly lower than brightness at the sharing viewing angle after the light control film is canceled, and brightness at the anti-peep viewing angle is also lower than brightness of the anti-peep viewing angle after the light control film is canceled. Therefore, canceling the light control film is also conducive to improving brightness at the sharing viewing angle and brightness at the anti-peep viewing angle, is further conducive to improving a display effect of the anti-peep display assembly in different modes.

Referring to FIGS. 16 and 17, when two birefringence control liquid crystal cells are introduced into the anti-peep display assembly and the backlight module 10 shown in FIG. 12, a better anti-peep effect at 45° (from FIG. 17, a brightness ratio of the anti-peep display assembly without a light control film at 45° is <1%) can be achieved with a good viewing angle in the sharing mode. Optionally, a ratio of brightness at horizontal angles of ±45° to brightness at a center is 2% to 30%. A shared viewing angle cannot be achieved when the light control film is introduced.

It should be noted that curves shown in FIG. 16 and FIG. 17 are all for a structure of the anti-peep display assembly with an introduction of two layers of birefringence control type liquid crystal cells. When no light control film is introduced between the first birefringence control type liquid crystal cell 21 and the backlight module 10, on the one hand, an influence of the light control film on brightness at a viewing angle after the introduction of the light control film can be avoided, on the other hand, when the two-layer birefringence control type liquid crystal cell is introduced into the anti-peep display assembly, an anti-peep performance can be significantly improved, which is also conductive to reducing an overall reflectivity of the anti-peep display assembly, thereby making a black state of the anti-peep display assembly darker, avoiding a whitening or bluish appearance of the anti-peep display assembly, an having a certain eye protection function.

Figure 18:
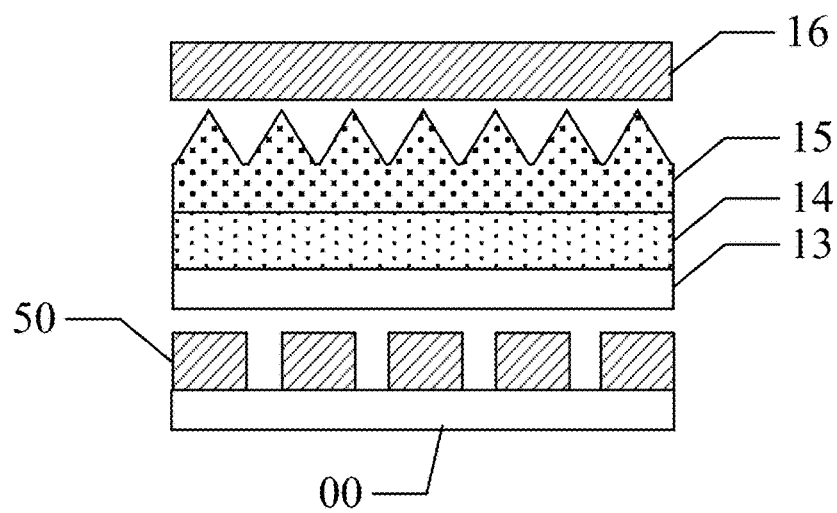
FIG. 18 illustrates another film layer diagram of a backlight module consistent with various embodiments of the present disclosure.

The embodiments shown in FIGS. 12 to 15 illustrate the backlight module 10 provided by the embodiments of the present disclosure by taking an edge-type backlight module 10 as an example. In some other embodiments, referring to FIG. 18, the backlight module 10 can also be embodied as a direct-type of backlight module 10. FIG. 18 illustrates another film layer diagram of a backlight module consistent with various embodiments of the present disclosure.

In an optional embodiment of the present disclosure, the backlight module 10 includes a light guide plate 12 and a light source 50. Referring to FIGS. 12 to 15, the light source 50 is located on a side of the light guide plate 12. Alternatively, referring to FIG. 18, the backlight module 10 includes a substrate 00 and a light source 50 on a side of the substrate 00 facing the display liquid crystal cell 30.

Specifically, when the light source 50 is on a side of the light guide plate 12, the corresponding backlight module 10 is an edge-type backlight module 10. It should be noted that the light guide plate 12 includes a light-emitting surface parallel to a light-emitting surface of the anti-peep display assembly, and a side surface of the light guide plate 12 is a surface intersecting with the light-emitting surface of the light guide plate. When the light source 50 is on a side of the substrate 00 facing the display liquid crystal cell 30, the corresponding backlight module 10 is a direct-type backlight module. Both the edge-type backlight module 10 and the direct-type backlight module 10 can provide uniform lights for the display liquid crystal cell 30. When the direct-type backlight module 10 is used, optionally, the light source 50 adopts a mini-LED, which is conductive to realizing a partition control of different display areas of the anti-peep display assembly and is conducive to improving a display control flexibility of the anti-peep display assembly. In addition, the direct-type backlight can realize a local dimming, so that the black state of the anti-peep display assembly is pure black, a dynamic contrast is higher, and a display is clearer.

Figure 19:
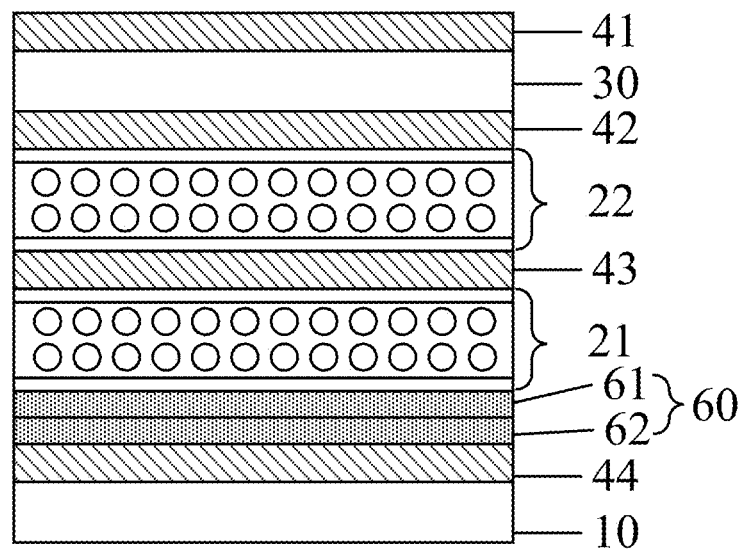
FIG. 19 illustrates another film layer diagram of an anti-peep display assembly consistent with various embodiments of the present disclosure.

FIG. 19 illustrates another film layer diagram of an anti-peep display assembly consistent with various embodiments of the present disclosure. In an optional embodiment, the anti-peep display assembly further includes at least one pair of positive "A" films 60 between the fourth polarizer 44 and the second polarizer 42. The positive "A" films 60 satisfy nz=ny<nx, nx represents a refractive index in a x-direction, ny represents a refractive index in a y-axis direction, and nz represents a refractive index in a z-axis direction. An extension direction of the x-axis is perpendicular to an extension direction of the y-axis, and an extension direction of the z-axis is perpendicular to an extension direction of the x-axis and an extension direction of the y-axis.

A positive "A" film is a retardation film with a retardation value in a thickness direction and satisfies nz=ny<nx. Optionally, a pair of positive "A" films 60 are perpendicular to each other. The positive "A" films 60 take a diameter on an equator of a Bonga sphere as an axis of rotation. When positive "A" films 60 that are perpendicular to each other (90°), angles of the positive "A" films 60 on the Bonga sphere are 180°, and points on a central viewing angle are also on the equator. Therefore, when the Bonga sphere passes through even-numbered layers of positive "A" films 60, the Bonga sphere just rotates clockwise and counterclockwise twice and returns to original position thereof, so the even-numbered layers of positive "A" films 60 have no effect on the central viewing angle. Therefore, when at least one pair of positive "A" films 60 are introduced between the fourth polarizer 44 and the second polarizer 42, a front view angle of the anti-peep display assembly will not be affected. A point on an oblique viewing angle is not on an equator of a Bonga sphere, after the Bonga sphere rotates through an odd number of layers and when the Bonga sphere passes through an even number of layers, the Bonga sphere will not rotate back to an original position, and a polarization state will be changed. Therefore, the oblique viewing angle is reduced, which is conductive to improve an anti-peep performance of the anti-peep display assembly.

It should be noted that points on the equator of the Bonga sphere represent linearly polarized lights, upper and lower poles correspond to a right-handed circularly polarized light and a left-handed circularly polarized light respectively. Other points on the sphere correspond to elliptically polarized lights. Points on an upper hemisphere are right-handed elliptically polarized lights, and points on a lower hemisphere are left-handed elliptically polarized lights. A spherical surface represents fully polarized lights. A center of the sphere represents a natural light, and other points within the sphere represent partially polarized lights.

In an optional embodiment of the present disclosure, a phase difference of the positive "A" films 60 satisfies 150 nm≤R0(550 nm)≤520 nm.

Specifically, different phase differences have different rotation angles on the Bonga sphere. The larger a phase difference, the larger a rotation angle. When a phase difference of the positive "A" films 60 is set to be 150 nm≤R0(550 nm)≤520 nm, rotations of points at the central viewing angle on the Bonga sphere can just return to original positions. Oblique viewing angles are just at larger values of polarization state changes, thereby having a better anti-peeping effect at the oblique viewing angle. If a phase difference is too large or too small, there will be some light leakage at oblique viewing angles, which affects an anti-peep performance.

In an optional embodiment of the present disclosure, a phase difference of the positive "A" films 60 satisfies R0(550 nm)=250 nm, or R0(550 nm)=500 nm.

The phase difference of the positive "A" films 60 satisfying R0(550 nm)=250 nm, or R0(550 nm)=500 nm is conductive to ensuring that rotations of points at the central viewing angle on the Bonga sphere can just return to the original position. Oblique viewing angles are just at larger values of polarization state changes, which are more conductive to improving an anti-peep effect of the anti-peep display assembly.

Referring to FIG. 19, in an optional embodiment of the present disclosure, a pair of positive "A" films 60 includes a first positive "A" film 61 and a second positive "A" film 62'. A slow axis direction of the first positive "A" film 61 is 45° and a slow axis direction of the second positive "A" film 62 is 135°. Specifically, when the slow axis angle of the first positive "A" film 61 is 45°, an angle of the first positive "A" film 61 on the Bonga sphere is 90°, and when the slow axis direction of the second positive "A" film 62 is 135°, an angle of the second positive "A" film 61 on the Bonga sphere is 270°, which can make left and right viewing angles symmetrical and has little effects on the center and at the left and right viewing angles, and only affects anti-peep performances at oblique viewing angles.

Figure 20:
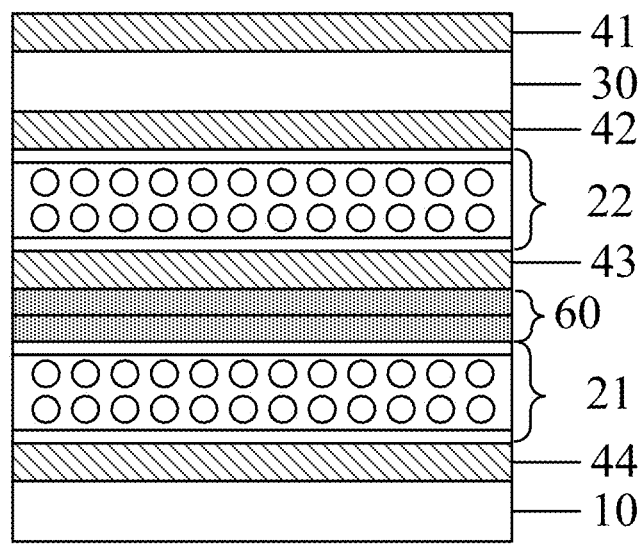
FIG. 20 illustrates another film layer diagram of an anti-peep display assembly consistent with various embodiments of the present disclosure.
Figure 21:
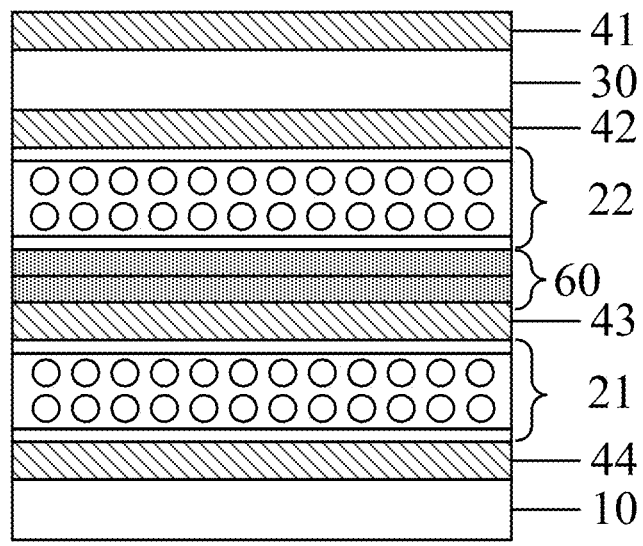
FIG. 21 illustrates another film layer diagram of an anti-peep display assembly consistent with various embodiments of the present disclosure.
Figure 22:
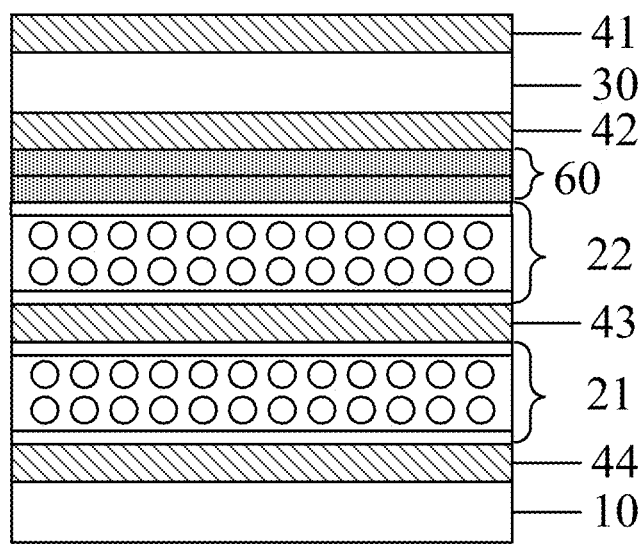
FIG. 22 illustrates another film layer diagram of an anti-peep display assembly consistent with various embodiments of the present disclosure.

FIGS. 20 to 22 respectively illustrate another film layer diagram of the anti-peep display assembly provided by the embodiment of the present disclosure. In an optional embodiment of the present disclosure, at least one pair of positive "A" films 60 are between the fourth polarizer 44 and the first birefringence control type liquid crystal cell 21, or at least one pair of positive "A" films 60 are between the first birefringence control type liquid crystal cell 21 and the third polarizer 43, or at least one pair of positive "A" films 60 are between the second birefringence control type liquid crystal cell 22 and the third polarizer 43, or at least one pair of positive "A" films 60 are between the second polarizer 42 and the birefringence control type liquid crystal cells 22.

Specifically, FIG. 19 to FIG. 22 respectively illustrate four possible installation positions of the positive "A" films 60 in the anti-peep display assembly when a pair of positive "A" films 60 are introduced into the anti-peep display assembly. In one embodiment shown in FIG. 19, a pair of positive "A" films 60 are between the fourth polarizer 44 and the first birefringence control type liquid crystal cell 21. In one embodiment shown in FIG. 20, a pair of positive "A" films 60 are between the first birefringence control type liquid crystal cell 21 and the third polarizer 43. In one embodiment shown in FIG. 21, a pair of positive "A" films 60 are between the second birefringence control type liquid crystal cell 22 and the third polarizer 43. In one embodiment shown in FIG. 22, a pair of positive "A" films 60 are between the second polarizer 42 and the second birefringence control type liquid crystal cell 22. A pair of positive "A" films 60 being arranged at any position on upper and lower sides of the first birefringence control type liquid crystal cell 21 and upper and lower sides of the second birefringence control type liquid crystal cell 22 are conductive to improving an anti-peep effect of the anti-peep display assembly.

Figure 23:
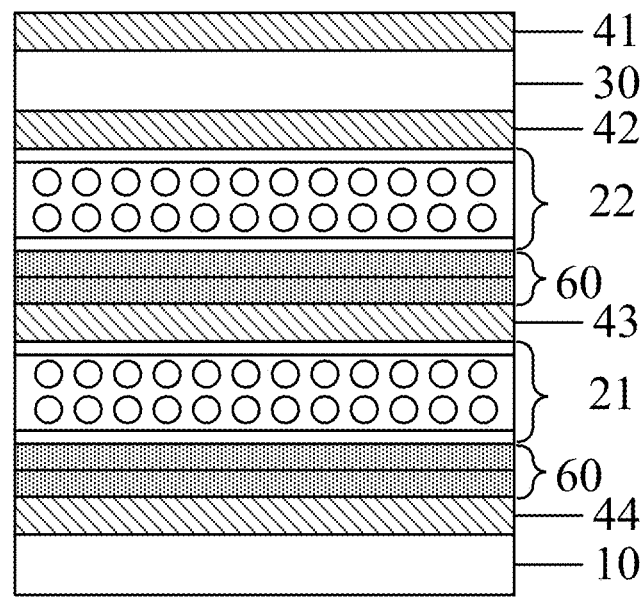
FIG. 23 illustrates another film layer diagram of an anti-peep display assembly consistent with various embodiments of the present disclosure.

FIG. 23 illustrates another film layer diagram of an anti-peep display assembly consistent with various embodiments of the present disclosure. One embodiment shows a scheme of introducing two pairs of positive "A" films 60 in the anti-peep display assembly. In an optional embodiment of the present disclosure, at least one pair of positive "A" films 60 are arranged between the fourth polarizer 44 and the first birefringence control type liquid crystal cell 21, and at least one pair of positive "A" films 60 are arranged between the third polarizer 43 and the second birefringence control type liquid crystal cell 22.

Specifically, in one embodiment of FIG. 23, a pair of positive "A" films 60 are respectively arranged between the fourth polarizer 44 and the first birefringence control type liquid crystal cell 21 and between the third polarizer 43 and the second birefringence control type liquid crystal cell 22. Introducing two pairs of positive "A" films 60 into the anti-peep display assembly is more conductive to reducing brightness of the anti-peep display assembly at oblique viewing angles and are more conductive to improving an anti-peep performance of the anti-peep display assembly.

It should be noted that FIG. 23 only illustrates a scheme when two pairs of positive "A" films 60 are introduced between the fourth polarizer 44 and the second polarizer 42. In some other embodiments of the present disclosure, three or more pairs of positive "A" films 60 may also be introduced into the anti-peep display assembly, which are not specifically limited herein. In addition, FIG. 23 only illustrates a position of the two pairs of positive "A" films 60. In some other embodiments of the present disclosure, the positive "A" films 60 may also be between other film layers between the fourth polarizer 44 and the second polarizer 42, which are not limited herein.

Figure 24:
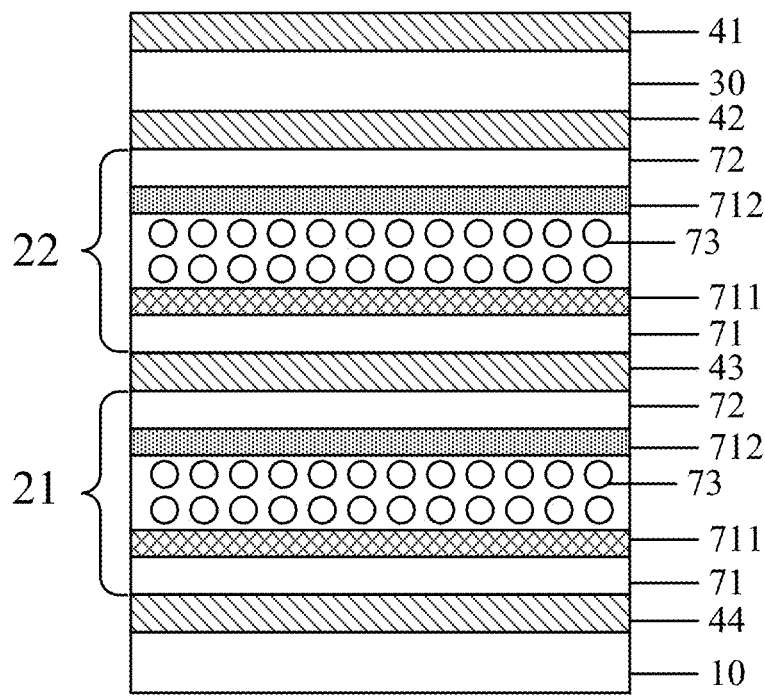
FIG. 24 illustrates another film layer diagram of an anti-peep display assembly consistent with various embodiments of the present disclosure.

FIG. 24 illustrates another film layer diagram of an anti-peep display assembly consistent with various embodiments of the present disclosure. Referring to FIG. 24, in an optional embodiment of the present disclosure, the first birefringence control type liquid crystal cell 21 and the second birefringence control type liquid crystal cell 22 respectively include a first substrate 71, a second substrate 72 arranged opposite to the first substrate 71 and a liquid crystal layer arranged between the first substrate 71 and the second substrate 72. The first substrate 71 is between the second substrate 72 and the backlight module 10. A first electrode layer 711 is arranged on a side of the first substrate 71 facing the liquid crystal layer, and a second electrode is arranged on a side of the second substrate 72 facing a liquid crystal layer 712.

Figure 25:
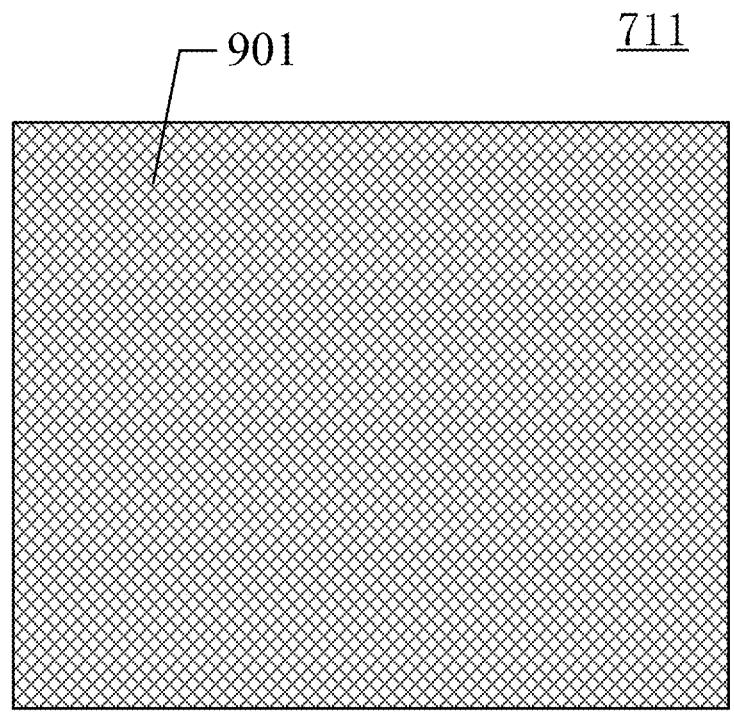
FIG. 25 illustrates a schematic diagram of a first electrode included on a first electrode layer consistent with various embodiments of the present disclosure.
Figure 26:
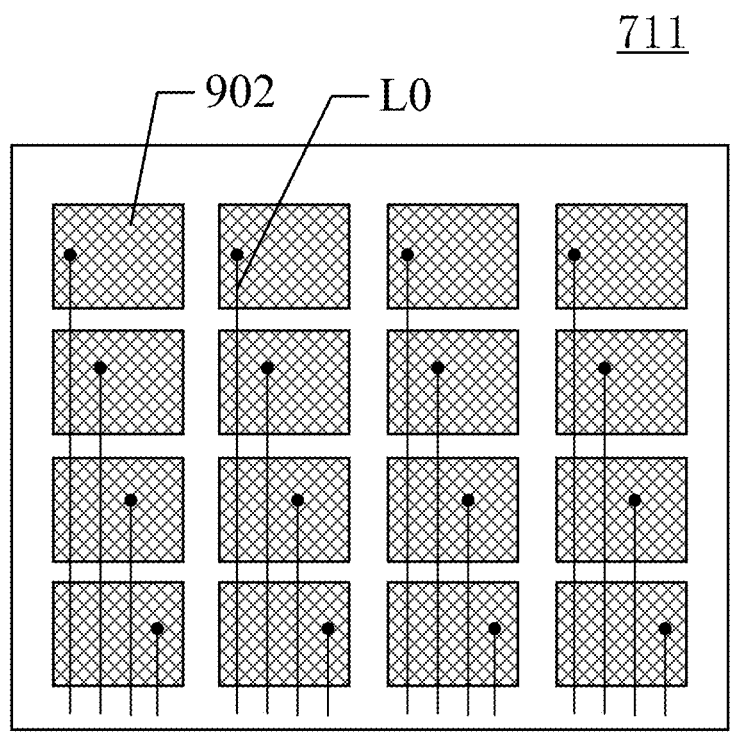
FIG. 26 illustrates another schematic diagram of first electrodes included on a first electrode layer consistent with various embodiments of the present disclosure.

Referring to FIG. 25 and FIG. 26, the first electrode layer 711 includes a whole surface first electrode 901 or a plurality of block-shaped first electrodes 902, and different block-shaped first electrodes 902 are respectively connected to different signal lines L0. The second electrode layer 712 includes a whole surface second electrode (for a structure of the whole surface second electrode, reference may be made to a structure of the whole surface first electrode 901 in FIG. 25, which is not shown herein). Along a thickness direction of the first birefringence control type liquid crystal cell 21 or the second birefringence control type liquid crystal cell 22, the first electrode on the first electrode layer 711 overlaps the second electrode on the second electrode layer 712. FIG. 25 illustrates a schematic diagram of a first electrode 901 included on the first electrode layer 711 consistent with various embodiments of the present disclosure. FIG. 26 illustrates another schematic diagram of first electrodes 902 included on the first electrode layer 711 consistent with various embodiments of the present disclosure.

Specifically, in the embodiment, the first electrode layer 711 and the second electrode layer 712 are respectively introduced into the first birefringence control type liquid crystal cell 21 and the second birefringence control type liquid crystal cell 22. The first electrode layer 711 is arranged on a side of the first substrate 71 facing the liquid crystal layer, and the second electrode layer 712 is arranged on a side of the second substrate 72 facing the liquid crystal layer. Optionally, the first electrode and the second electrode on the first electrode layer 711 and the second electrode layer 712 are both transparent electrodes. When voltages are respectively applied to the first electrode and the second electrode, an electric field that drives the liquid crystal to deflect will be generated between the first electrode and the second electrode, so that the anti-peep display assembly enters the anti-peep mode.

Optionally, both the first electrode and the second electrode in a same birefringence control type liquid crystal cell can be embodied as a whole surface structure shown in FIG. 25. For example, along a thickness direction of the anti-peep display assembly, both the first electrode and the second electrode cover at least display areas of the display liquid crystal cell. Therefore, the anti-peep display assembly can be controlled to enter the anti-peep mode only by supplying corresponding voltage signals to the first electrode and the second electrode, which is conductive to simplifying a control process of the anti-peep display assembly.

Optionally, referring to FIG. 26, the first electrode layer 711 in the embodiment of the present disclosure may further include a plurality of block-shaped first electrodes 902. Optionally, different block-shaped first electrodes 902 are respectively connected to different signal lines L0, so that a partition control of voltages of different block-shaped electrodes can be realized, so that different areas of the same privacy display module can enter different display modes. For example, some areas are displayed in the sharing mode, and some areas are displayed in the anti-peep mode, thereby realizing a flexible control of the display modes in different areas of the anti-peep display assembly.

It should be noted that number and size of the block-shaped first electrodes 902 included in the first electrode layer 711 can be flexibly set according to actual needs. Assuming that the anti-peep display assembly is a horizontal screen display structure applied in the vehicle display field, the first electrode layer 711 can be divided into at least two block-shaped first electrodes 902 arranged along a longitudinal direction of the display screen, so that the display modes corresponding to a driver's seat and a co-driver's seat can be controlled separately, thereby improving an application flexibility of the anti-peep display assembly. In some other embodiments of the present disclosure, the block-shaped first electrodes 902 can also be arranged to correspond one-to-one with sub-pixels in display areas in the display liquid crystal cell, to realize a fine control of the display modes in different areas of the anti-peep display assembly.

Figure 27:
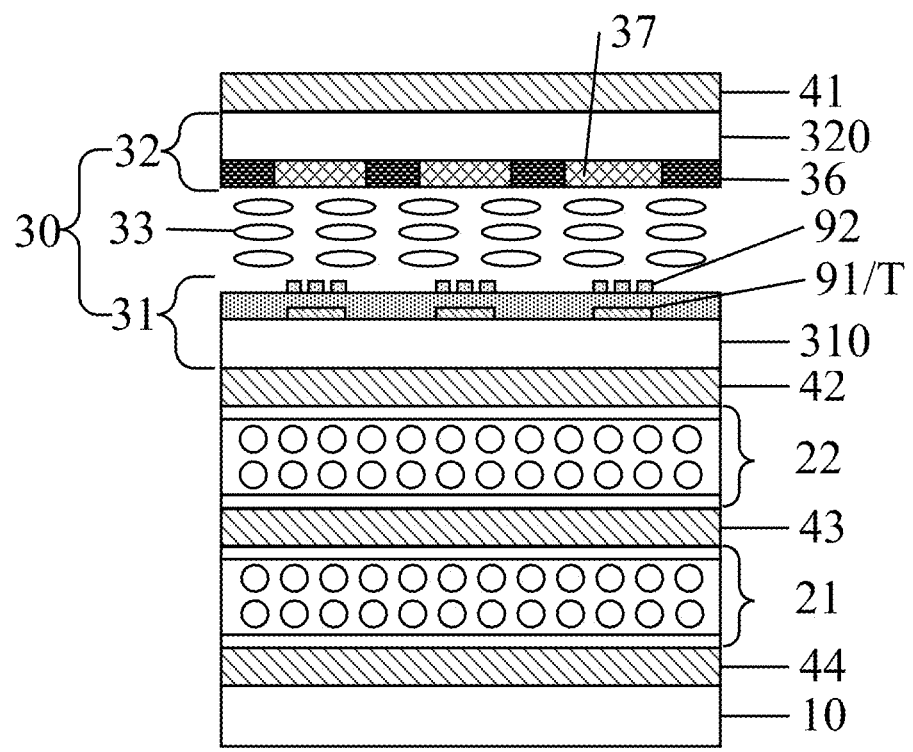
FIG. 27 illustrates another film layer diagram of an anti-peep display assembly consistent with various embodiments of the present disclosure.

FIG. 27 illustrates another film layer diagram of a backlight module consistent with various embodiments of the present disclosure. In one embodiment, a structure of the display liquid crystal cell 30 is refined in the anti-peep display assembly. It should be noted that a corresponding relationship between numbers of pixel electrodes 92 and the common electrodes 91 shown in FIG. 27 is only for illustration. One common electrode 91 may correspond to a plurality of pixel electrodes 92.

Referring to FIG. 27, in an optional embodiment of the present disclosure, the display liquid crystal cell 30 includes a color filter substrate 32, an array substrate 31 arranged opposite to the color filter substrate 32, and a liquid crystal 33 arranged between the color filter substrate 32 and the array substrate 31. The array substrate 31 includes a first substrate 310, the color filter substrate 32 includes a second substrate 320, and the display module further includes touch electrodes T between the first substrate 310 and the second substrate 320.

Specifically, in the anti-peep display assembly provided by the embodiment of the present disclosure, the display liquid crystal cell 30 includes a color filter substrate 32 and an array substrate 31 arranged opposite to the color filter substrate 32. When the touch electrodes T are introduced into the anti-peep display assembly to enable the anti-peep display assembly to have a touch function, in one embodiment, the touch electrodes T are arranged in the display liquid crystal cell 30 arranged close to a light-emitting surface of the anti-peep display assembly. The touch electrodes T are specifically arranged between the first substrate 310 of the array substrate 31 and the second substrate 320 of the color filter substrate 32, to reduce distances between touch bodies and the touch electrodes T, and to increase an amount of the coupling capacitance generated during a touch process, which is conductive to improving a touch performance of the anti-peep display assembly. If the touch electrodes T are arranged on a side of the display liquid crystal cell 30 facing the backlight module 10, especially if the touch electrodes T are arranged on a side of the second birefringence control type liquid crystal cell 22 facing the backlight module 10, electrodes in the birefringence control type liquid crystal cell are very likely to shield the touch electrodes T, which seriously affects a touch stability and reliability of the touch electrodes T. In the present specification, when the touch electrodes T are arranged in the display liquid crystal cell 30, since the display liquid crystal cell 30 is on a side of the first birefringence control type liquid crystal cell 21 and the second birefringence control type liquid crystal cell 22 away from the backlight module 10, the touch electrodes T are also on the side of the first birefringence control type liquid crystal cell 21 and the second birefringence control type liquid crystal cell 22 away from the backlight module 10. The electrodes in the first birefringence control type liquid crystal cell 21 and the second birefringence control type liquid crystal cell 22 do not affect the touch electrodes T in the display liquid crystal cell 30. Therefore, in the present specification, the above manner of arranging the touch electrodes T in the display liquid crystal cell is also conductive to improving the touch stability and reliability of the touch electrodes T.

In addition, compared with a manner of arranging the touch electrodes in a form of external hanging, the present specification arranges the touch electrodes T in the display liquid crystal cell 30, which is also conductive to reducing an overall thickness of the anti-peep display assembly.

Figure 28:
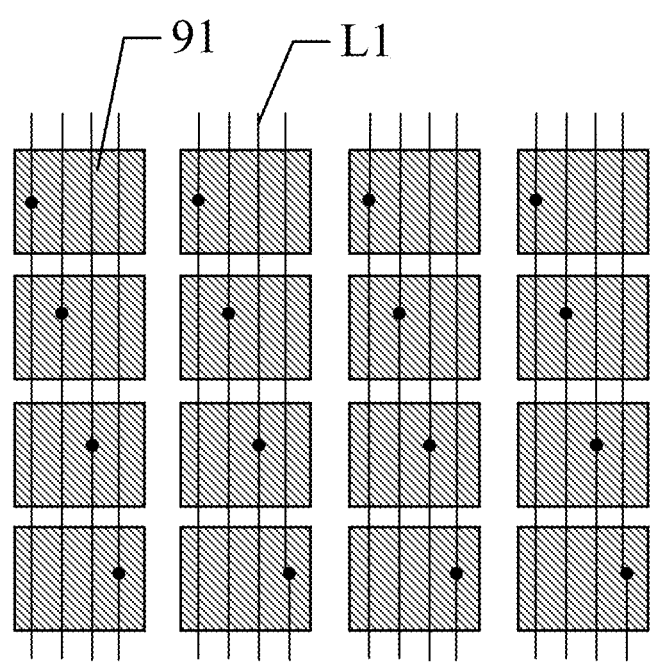
FIG. 28 illustrates a schematic diagram of touch electrodes in an anti-peep display assemblies consistent with various embodiments of the present disclosure.
Figure 29:
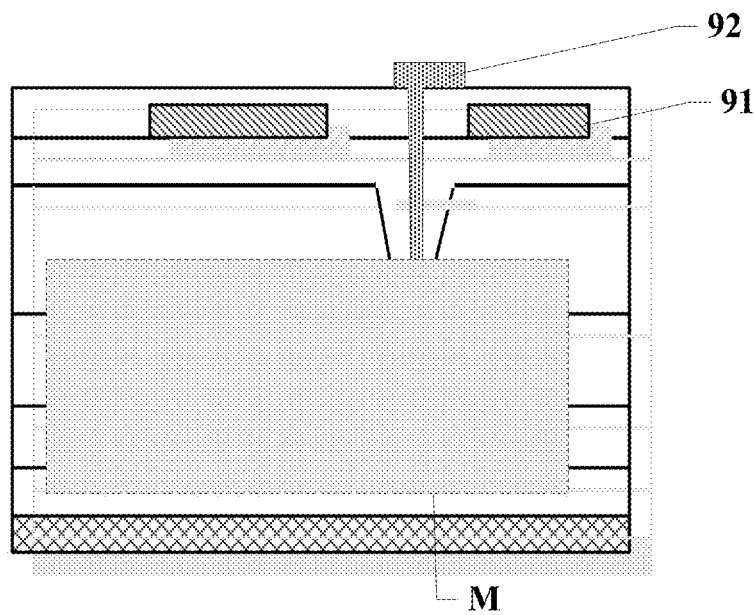
FIG. 29 illustrates a film layer diagram of an array substrate in a liquid crystal cell.

FIG. 28 illustrates a schematic diagram of touch electrodes in an anti-peep display assemblies consistent with various embodiments of the present disclosure. FIG. 29 illustrates a film layer diagram of an array substrate in a liquid crystal cell. It should be noted that FIG. 29 only illustrates a film layer structure of the array substrate 31 in the display liquid crystal cell 30 and does not represent an actual number and size of film layers. Optionally, the array substrate 31 includes a plurality of transistors M. Referring to FIGS. 27 to 29, in an optional embodiment of the present disclosure, the touch electrodes T are self-capacitance touch electrodes. The display liquid crystal cell 30 includes pixel electrodes 92 and common electrodes 91 arranged between the first substrate 310 and the second substrate 320, a common electrode 91 includes a plurality of electrode blocks, and a common electrode 91 is multiplexed as a touch electrode T.

Specifically, when the touch electrodes T are introduced into the display liquid crystal cell 30, the common electrodes 91 in the display liquid crystal cell 30 are reused as the touch electrodes T, so that there is no need to introduce a separate film layer for the touch electrodes T into the display liquid crystal cell 30, thereby simplifying a film layer structure of the display liquid crystal cell 30 and a manufacturing process of the display liquid crystal cell 30. When the common electrodes 91 are multiplexed as the touch electrodes T, in a display stage, the common electrodes 91 are used to transmit common voltage signals. In a touch detection stage, the common electrodes 91 are used to transmit touch signals, thereby realizing time-division multiplexing of the common electrodes 91.

Referring to FIG. 28, when the touch electrodes T are embodied as self-capacitance touch electrodes, electrode blocks in the common electrode 91 that are multiplexed for touch control are respectively connected to different signal lines. In a touch detection stage, when coupling capacitances on the electrode block change, change signals can be transmitted through corresponding signal lines, so that positions where touches occur can be determined.

Referring to FIG. 27 and FIG. 29, in an optional embodiment of the present disclosure, the common electrodes 91 are on the array substrate 31. When the common electrodes 91 are arranged on the array substrate 31, signal lines connected to the common electrodes 91 can be directly extended to fan-out areas on the array substrate 31 to form electrical connections with binding terminals of binding areas, to facilitate electrical connections with driver chips or flexible circuit boards, which is conducive to simplifying an overall manufacturing process of the display liquid crystal cell 30.

Optionally, referring to FIG. 29, the array substrate 31 includes a first metal layer 01, a second metal layer 02, an active layer 03, a gate insulating layer 04 between the first metal layer 01 and the active layer 02, an interlayer insulating layer 05 between the first metal layer 01 and the second metal layer 02, a planarization layer 06 on a side of the second metal layer 02 away from the first metal layer 01, and a first passivation layer 07 and a second passivation layer 08 on a side of the planarization layer away from the second metal layer 02. The second passivation layer 08 is configured to isolate the common electrodes 91 from the pixel electrodes 92. Optionally, the gate insulating layer 04 includes a single or a plurality of inorganic layers of silicon oxide, silicon nitride or metal oxide. The interlayer insulating layer 05 may formed of insulating inorganic layers of silicon oxide or silicon nitride. In some other embodiments, the interlayer insulating layer may also be formed of insulating organic layers. The planarization layer includes an organic material such as acrylic, polyimide or benzo cyclobutene. The first passivation layer and the second passivation layer may be formed of an inorganic layer of silicon oxide or silicon nitride, or an organic layer.

Figure 30:
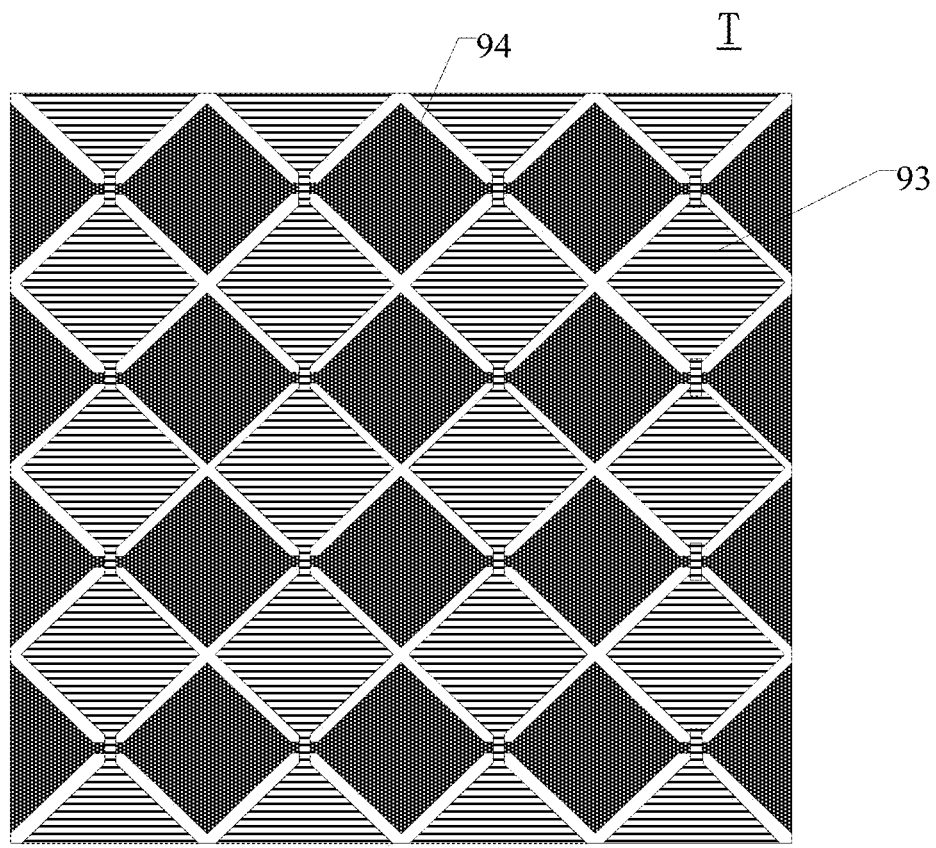
FIG. 30 illustrates another schematic diagram of touch electrodes in an anti-peep display assembly consistent with various embodiments of the present disclosure.

FIG. 30 illustrates another schematic diagram of touch electrodes in an anti-peep display assembly consistent with various embodiments of the present disclosure. In one embodiment, the touch electrodes T are mutual capacitive touch electrodes.

Referring to FIG. 30 and appropriately referring to FIG. 27, in an optional embodiment, the touch electrodes T are mutual capacitive touch electrodes. The touch electrodes T include touch driving electrodes 93 and touch sensing electrodes 94. Both the touch driving electrodes 93 and the touch sensing electrodes 94 are on the array substrate 31, or both the touch driving electrodes 93 and the touch sensing electrodes 94 are on the color filter substrate 32.

Specifically, in the embodiment, when the touch electrodes T are mutual capacitive touch electrodes, the touch driving electrodes 93 and the touch sensing electrodes 94 are arranged on a same substrate. Compared with a manner of arranging the touch driving electrodes 93 and the touch sensing electrodes 94 on the array substrate 31 and the color filter substrate 32 respectively, a manner of arranging both the touch driving electrodes 93 and the touch sensing electrodes 94 on the array substrate 31 or the color filter substrate 32 is conductive to reducing a distance between the touch driving electrodes 93 and the touch sensing electrodes 94, and is conductive to increasing a capacitance change between the touch driving electrodes 93 and the touch-sensing electrodes 94 when a touch body touches the anti-peep display assembly, thereby improving a touch performance of the anti-peep display assembly.

Referring to FIG. 27, in an optional embodiment, the display liquid crystal cell 30 includes a color filter substrate 32, an array substrate 31 arranged opposite to the color filter substrate 32, and a liquid crystal 33 arranged between the color filter substrate 32 and the array substrate 31. The color filter substrate 32 includes a second substrate 320, black matrixes 36 and color resistances 37 arranged on a side of the second substrate 320 facing the array substrate 31. The black matrixes 36 define a plurality of openings, and the color resistances 37 are filled in the plurality of openings.

Specifically, the anti-peep display assembly provided by the embodiments of the present disclosure is provided with three liquid crystal cells. The display liquid crystal cell 30 includes the color filter substrate 32 and the array substrate 31. The color filter substrate 32 is provided with color resistances 37. Optionally, the color resistances 37 include at least red color resistances, green color resistances and blue color resistances. Lights emitted by the backlight module 10 are irradiated to the display liquid crystal cell 30 after passing through the first birefringence control type liquid crystal cell 21 and the second birefringence control type liquid crystal cell 22, to form lights of corresponding colors when passing through the color resistances 37 of different colors in the display liquid crystal cell 30, thereby realizing a color display function of the anti-peep display assembly. The color resistances 37 on the color filter substrate 32 of the display liquid crystal cell 30 are arranged in the openings formed by the black matrixes 36. When external lights are irradiated to the anti-peep display assembly, the black matrixes 36 in the display liquid crystal cell 30 can absorb the external lights, reduce or avoid reflections of the external lights in the anti-peep display assembly, which is conductive to reduce a reflectivity of the anti-peep display assembly and improve a display effect of the anti-peep display assembly in a large light intensity environment.

Figure 31:
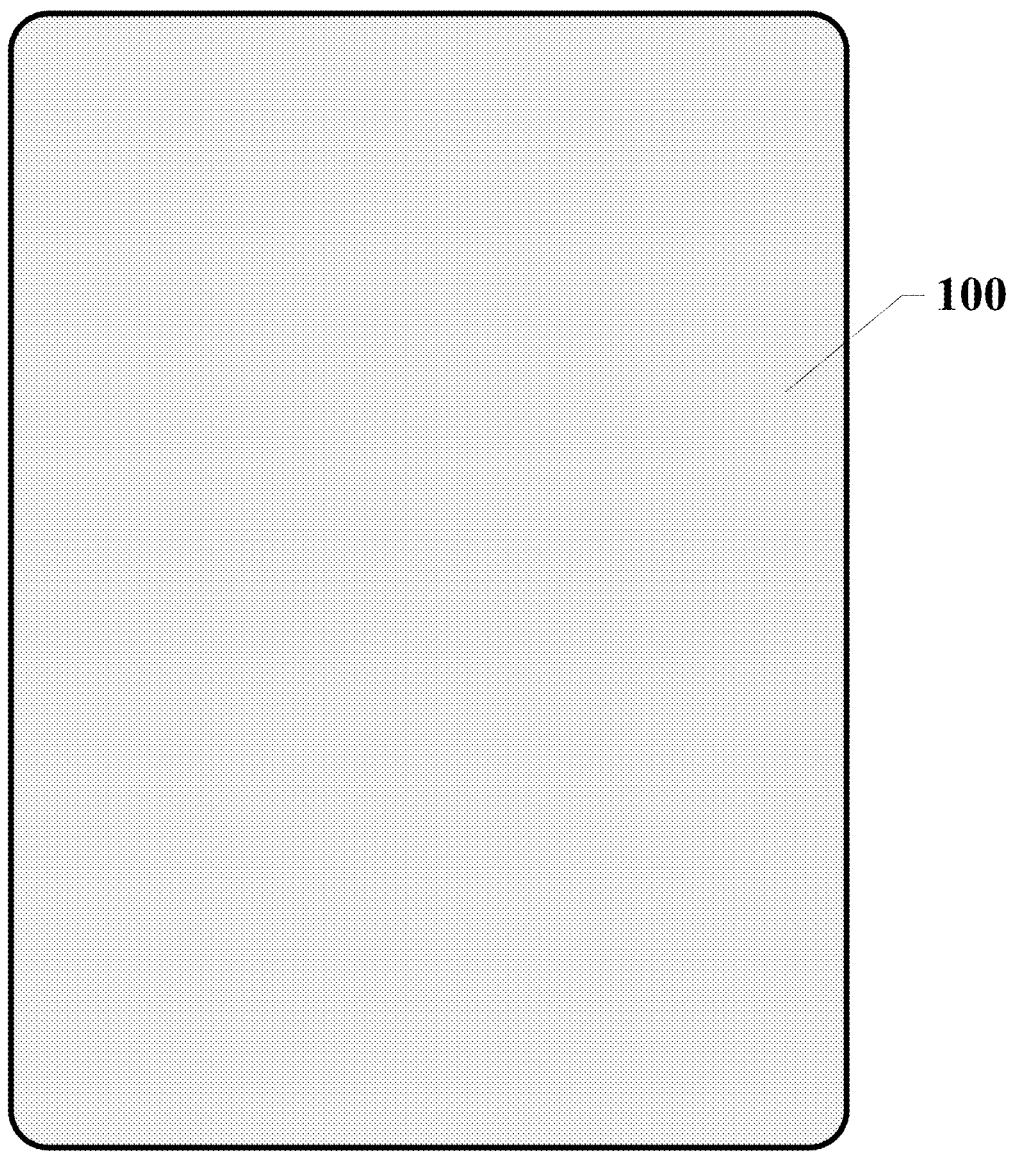
FIG. 31 illustrates a schematic diagram of a display device consistent with various embodiments of the present disclosure.

Based on a same inventive concept, the present disclosure also provides a display device. FIG. 31 illustrates a schematic diagram of a display device consistent with various embodiments of the present disclosure. Referring to FIG. 31, in one embodiment, the display device includes the anti-peep display assembly provided in any of the above embodiments of the present disclosure.

It can be understood that the display device provided in the embodiment may be a mobile phone, a tablet, a computer, a TV, a vehicle-mounted display device, or another display device with a display function, which is not specifically limited herein. The display device provided by the embodiment of the present disclosure has beneficial effects of the anti-peep display assembly provided by the embodiments of the present disclosure. For details, reference may be made to specific descriptions of the anti-peep display assembly in the above embodiments, which are not repeated herein.

In summary, the anti-peep display assembly and display device provided by the present disclosure at least achieve the following beneficial effects.

In the anti-peep display assembly and the display device provided by the embodiments of the present disclosure, the first birefringence control type liquid crystal cell and the second birefringence control type liquid crystal cell are introduced between the backlight module and the display liquid crystal cell. That is, the first birefringence control type liquid crystal cell and the second birefringence control type liquid crystal cell are on the side of the display liquid crystal cell facing the backlight module and are not arranged on the light-emitting surface of the display liquid crystal cell. When external lights enters the anti-peep display assembly, the display liquid crystal cell can block propagation paths of the external lights to the first birefringence control type liquid crystal cell and the second birefringence control type liquid crystal cell to a large extent, thereby effectively reducing or avoiding reflections when the external lights are irradiated to the first birefringence control type liquid crystal cell and the second birefringence control type liquid crystal cell, which is conductive to reducing the overall reflectivity of the anti-peep display assembly, and further improve a user experience since a display effect of the anti-peep display assembly in an environment with strong external lights is improved.

In addition, in the anti-peep display assembly provided by the present disclosure, two birefringence control type liquid crystal cells are introduced between the display liquid crystal cell and the backlight module. In the narrow viewing angle mode, both the first birefringence control liquid crystal cell and the second birefringence control liquid crystal cell can filter out lights at large viewing angles. A combination of the first birefringence control liquid crystal cell and the second birefringence control liquid crystal cell can filter out more lights at large viewing angles, thereby making a better anti-peep effect of the anti-peep display assembly in the narrow viewing angle mode.

Although some specific embodiments of the present disclosure have been described in detail by way of examples, a person skilled in the art should understand that the above examples are for illustration only and are not intended to limit the scope of the present disclosure. The above embodiments can be modified by a person skilled in the art without departing from the scope and spirit of the present disclosure. The protection scope of the present disclosure is limited by appended claims.

What is claimed is:

1. An anti-peep display assembly, comprising a backlight module, a first birefringence control type liquid crystal cell, a second birefringence control type liquid crystal cell, and a display liquid crystal cell, wherein:
    along a thickness direction of the anti-peep display assembly, the first birefringence control type liquid crystal cell and the second birefringence control type liquid crystal cell are between the backlight module and the display liquid crystal cell, and the first birefringence control type liquid crystal cell is between the second birefringence control type liquid crystal cell and the backlight module;
    a first polarizer is arranged on a side of the display liquid crystal cell away from the second birefringence control type liquid crystal cell, a second polarizer is arranged between the display liquid crystal cell and the second birefringence control type liquid crystal cell, and transmission axes of the first polarizer and the second polarizer are perpendicular to each other; and
    a third polarizer is arranged between the second birefringence control type liquid crystal cell and the first birefringence control type liquid crystal cell, a fourth polarizer is arranged between the first birefringence control type liquid crystal cell and the backlight module, and transmission axes of the second polarizer, the third polarizer, and the fourth polarizer are parallel to each other,
    wherein a phase difference of liquid crystals in both the first birefringence control type liquid crystal cell and the second birefringence control type liquid crystal cell is between 500 nm and 800 nm to improve an anti-peep performance and to avoid display color shift.

2. The anti-peep display assembly according to claim 1, wherein:
    the backlight module includes a reflective sheet, a light guide plate, a diffuser film, a first prism film and a second prism film, along a thickness direction of the backlight module, the reflection sheet and the diffuser film are respectively located on two opposite surfaces of the light guide plate, the first prism film is on a surface of the diffuser film on a side away from the light guide plate, and the second prism film is on a surface of the first prism film away from the diffuser film; and
    the fourth polarizer is on a side of the second prism film away from the first prism film.

3. The anti-peep display assembly according to claim 2, wherein prisms in the first prism film are orthogonal to extending directions of prisms in the second prism film.

4. The anti-peep display assembly according to claim 2, wherein the backlight module further includes a dual-brightness enhancement film between the second prism film and the first birefringence control type liquid crystal cell.

5. The anti-peep display assembly according to claim 2, wherein the backlight module further includes a light control film disposed between the second prism film and the first birefringence control type liquid crystal cell.

6. The anti-peep display assembly according to claim 1, wherein:
the backlight module includes a reflective sheet, a collimating light guide plate and an inverse prism film, and along the thickness direction of the backlight module, the reflective sheet and the inverse prism film are respectively on two opposite surfaces of the collimating light guide plate; and
the fourth polarizer is on a side of the inverse prism film away from the collimating light guide plate.

7. The anti-peep display assembly according to claim 6, wherein the inverse prism film includes convex microstructures on the surface of the inverse prism film facing the collimating light guide plate.

8. The anti-peep display assembly according to claim 1, wherein along the thickness direction of the backlight module, no light control film is arranged between the backlight module and the fourth polarizer, and between the fourth polarizer and the first birefringence control type liquid crystal cell.

9. The anti-peep display assembly according to claim 1, wherein the backlight module includes a light guide plate and a light source, the light source is on a side of the light guide plate, or the backlight module includes a substrate and a light source, and the light source is on a side of the substrate facing the display liquid crystal cell.

10. The anti-peep display assembly according to claim 1, further comprising at least one pair of positive "A" films, wherein:
the at least one pair of positive "A" films are between the fourth polarizer and the second polarizer, and the positive "A" films satisfy nz=ny<nx, nx represents a refractive index in a x-direction, ny represents a refractive index in a y-axis direction, nz represents a refractive index in a z-axis direction, an extension direction of the x-axis is perpendicular to an extension direction of the y-axis, and an extension direction of the z-axis is perpendicular to the extension direction of the x-axis and the extension direction of the y-axis; and
a phase difference of the at least one pair of positive "A" films satisfies 150 nm≤R0(550 nm)≤520 nm.

11. The anti-peep display assembly according to claim 10, wherein a phase difference of the at least one pair of positive "A" films satisfies R0(550 nm)=250 nm, or R0(550 nm)=500 nm.

12. The anti-peep display assembly according to claim 10, wherein a pair of positive "A" films includes a first positive "A" film and a second positive "A" film, a slow axis direction of the first positive "A" film is 45°, and a slow axis direction of the second positive "A" film is 135°.

13. The anti-peep display assembly according to claim 10, wherein the at least one pair of positive "A" films are between the fourth polarizer and the first birefringence control type liquid crystal cell, or the at least one pair of positive "A" films are between the first birefringence control type liquid crystal cell and the third polarizer, or the at least one pair of positive "A" films are between the second birefringence control type liquid crystal cell and the third polarizer, or the at least one pair of positive "A" films are between the second polarizer and the second birefringence control type liquid crystal cell.

14. The anti-peep display assembly according to claim 10, wherein the at least one pair of positive "A" films are arranged between the fourth polarizer and the first birefringence control type liquid crystal cell, or the at least one pair of positive "A" films are arranged between the third polarizer and the second birefringence control type liquid crystal cell.

15. The anti-peep display assembly according to claim 1, wherein:
the first birefringence control type liquid crystal cell and the second birefringence control type liquid crystal cell respectively comprise a first substrate, a second substrate arranged opposite to the first substrate and a liquid crystal cell arranged between the first substrate and the second substrate;
the first substrate is between the second substrate and the backlight module;
a first electrode layer is arranged on a side of the first substrate facing the liquid crystal layer, and a second electrode layer is arranged on a side of the second substrate facing the liquid crystal layer;
the first electrode layer includes a whole surface first electrode or a plurality of block-shaped first electrodes, and different block-shaped first electrodes are respectively connected to different signal lines; and
the second electrode layer includes a whole surface second electrode, and along a thickness direction of the first birefringence control type liquid crystal cell or the second birefringence control type liquid crystal cell, the whole surface first electrode or the plurality of block-shaped first electrodes overlaps the whole surface second electrode.

16. The anti-peep display assembly according to claim 1, wherein:
the display liquid crystal cell includes a color filter substrate, an array substrate arranged opposite to the color filter substrate, and a liquid crystal arranged between the color filter substrate and the array substrate;
the array substrate includes a first substrate, the color filter substrate includes a second substrate, and the display module further includes touch electrodes between the first substrate and the second substrate;
the touch electrodes are self-capacitance touch electrodes, the display liquid crystal cell includes pixel electrodes and common electrodes arranged between the first substrate and the second substrate, the common electrodes include a plurality of electrode blocks, and the common electrodes are multiplexed as the touch electrodes; or
the touch electrodes are mutual capacitive touch electrodes, the touch electrodes include touch drive electrodes and touch sensing electrodes, both the touch drive electrodes and the touch sensing electrodes are on the array substrate, or both the touch driving electrodes and the touch sensing electrodes are on the color filter substrate.

17. The anti-peep display assembly according to claim 16, wherein
the common electrodes are on the array substrate.

18. The anti-peep display assembly according to claim 1, wherein:
the display liquid crystal cell includes a color filter substrate, an array substrate arranged opposite to the color filter substrate, and a liquid crystal arranged between the color filter substrate and the array substrate; and
the color filter substrate includes a second substrate, black matrixes and color resistances arranged on a side of the second substrate facing the array substrate, the black matrixes define a plurality of openings, and the color resistances are filled in the plurality of openings.

19. The anti-peep display assembly according to claim 1, wherein a polarization direction of the fourth polarizer is parallel to an alignment direction of liquid crystals in the first birefringence control type liquid crystal cell.

20. A display device, comprising an anti-prep display module comprising a backlight module, a first birefringence control type liquid crystal cell, a second birefringence control type liquid crystal cell, and a display liquid crystal cell, wherein:

along a thickness direction of the anti-peep display assembly, the first birefringence control type liquid crystal cell and the second birefringence control type liquid crystal cell are between the backlight module and the display liquid crystal cell, and the first birefringence control type liquid crystal cell is between the second birefringence control type liquid crystal cell and the backlight module;

a first polarizer is arranged on a side of the display liquid crystal cell away from the second birefringence control type liquid crystal cell, a second polarizer is arranged between the display liquid crystal cell and the second birefringence control type liquid crystal cell, and transmission axes of the first polarizer and the second polarizer are perpendicular to each other; and a third polarizer is arranged between the second birefringence control type liquid crystal cell and the first birefringence control type liquid crystal cell, a fourth polarizer is arranged between the first birefringence control type liquid crystal cell and the backlight module, and transmission axes of the second polarizer, the third polarizer, and the fourth polarizer are parallel to each other, wherein a phase difference of liquid crystals in both the first birefringence control type liquid crystal cell and the second birefringence control type liquid crystal cell is between 500 nm and 800 nm to improve an anti-peep performance and to avoid display color shift.

* * * * *